(12) United States Patent
Hunt

(10) Patent No.: US 11,032,275 B2
(45) Date of Patent: Jun. 8, 2021

(54) SYSTEM FOR IMPROVED IDENTIFICATION AND AUTHENTICATION

(71) Applicant: Mimecast Services Ltd., London (GB)

(72) Inventor: Simon Hunt, Bexleyheath (GB)

(73) Assignee: Mimecast Services Ltd., London (GB)

( * ) Notice: Subject to any disclaimer, the term of this patent is extended or adjusted under 35 U.S.C. 154(b) by 0 days.

(21) Appl. No.: 16/574,535

(22) Filed: Sep. 18, 2019

(65) Prior Publication Data

US 2020/0112560 A1 Apr. 9, 2020

Related U.S. Application Data

(60) Provisional application No. 62/741,601, filed on Oct. 5, 2018.

(51) Int. Cl.
*G06F 21/31* (2013.01)
*H04L 9/32* (2006.01)
*H04L 29/06* (2006.01)

(52) U.S. Cl.
CPC .......... *H04L 63/0861* (2013.01); *G06F 21/31* (2013.01); *H04L 9/3226* (2013.01); *H04L 9/3234* (2013.01); *H04L 9/3271* (2013.01); *H04L 63/0442* (2013.01); *H04L 63/083* (2013.01); *H04L 63/0807* (2013.01); *H04L 63/0838* (2013.01); *H04L 63/0846* (2013.01); *H04L 63/0853* (2013.01)

(58) Field of Classification Search
None
See application file for complete search history.

(56) References Cited

U.S. PATENT DOCUMENTS

| | | | |
|---|---|---|---|
| 6,965,968 B1 | 11/2005 | Touboul | |
| 7,058,822 B2 | 6/2006 | Edery et al. | |
| 7,418,731 B2 | 8/2008 | Touboul | |
| 7,647,633 B2 | 1/2010 | Edery et al. | |
| 8,141,154 B2 | 3/2012 | Gruzman et al. | |
| 9,602,853 B2* | 3/2017 | Naggar | G06Q 30/06 |
| 10,057,240 B2* | 8/2018 | Mihaylov | H04L 63/0815 |
| 10,182,044 B1* | 1/2019 | Praus | G06F 21/33 |
| 10,277,628 B1 | 4/2019 | Jakobsson | |
| 10,609,073 B2 | 3/2020 | Jakobsson | |
| 2004/0187018 A1* | 9/2004 | Owen | G06F 21/31 |
| | | | 713/184 |
| 2007/0169189 A1* | 7/2007 | Crespo | G06F 21/6227 |
| | | | 726/20 |
| 2008/0256617 A1* | 10/2008 | Cartwell | G06F 21/34 |
| | | | 726/9 |
| 2010/0262834 A1* | 10/2010 | Freeman | G06F 21/31 |
| | | | 713/184 |
| 2011/0197266 A1* | 8/2011 | Chu | H04L 9/3228 |
| | | | 726/5 |
| 2011/0289572 A1* | 11/2011 | Skeel | H04L 9/3271 |
| | | | 726/7 |
| 2013/0047227 A1* | 2/2013 | Schultz | H04L 63/102 |
| | | | 726/7 |

(Continued)

*Primary Examiner* — Jason Chiang
(74) *Attorney, Agent, or Firm* — Nutter McClennen & Fish LLP

(57) ABSTRACT

The present disclosure relates generally to computer security and human-computer interaction, and, more particularly, to systems and methods for providing improved user authentication and verification techniques by way of credential-less or near credential-less user input.

20 Claims, 14 Drawing Sheets

(56) References Cited

U.S. PATENT DOCUMENTS

| | | | |
|---|---|---|---|
| 2014/0143078 A1* | 5/2014 | Meehan | G06Q 20/204 |
| | | | 705/21 |
| 2014/0189359 A1* | 7/2014 | Marien | H04L 9/3228 |
| | | | 713/172 |
| 2014/0201536 A1* | 7/2014 | Fiske | H04L 9/0844 |
| | | | 713/183 |
| 2014/0259108 A1* | 9/2014 | Clark | H04L 63/08 |
| | | | 726/3 |
| 2015/0058950 A1* | 2/2015 | Miu | H04L 63/105 |
| | | | 726/7 |
| 2015/0242852 A1* | 8/2015 | Goldstone | G06Q 20/10 |
| | | | 705/44 |
| 2016/0219039 A1* | 7/2016 | Houthooft | H04L 9/3215 |
| 2016/0248752 A1* | 8/2016 | Blinn | H04L 63/083 |
| 2016/0350751 A1* | 12/2016 | Keys | G06Q 20/3829 |
| 2017/0148009 A1* | 5/2017 | Perez Lafuente | G06Q 20/3223 |
| 2018/0351944 A1* | 12/2018 | Cho | H04L 63/0838 |

* cited by examiner

SYSTEM FOR IMPROVED IDENTIFICATION AND AUTHENTICATION

CROSS-REFERENCE TO RELATED APPLICATIONS

This application claims the benefit of, and priority to, U.S. Provisional Application No. 62/741,601, filed Oct. 5, 2018, the content of which is hereby incorporated by reference herein in its entirety.

FIELD

The present disclosure relates generally to computer security, and, more particularly, to systems and methods for providing credential-less or near credential-less authentication and verification techniques.

BACKGROUND

Computer security, cybersecurity, or information technology security (IT security) is the protection of computer systems from theft or damage to their hardware, software or electronic data, as well as from disruption or misdirection of the services they provide. The field is growing in importance due to increasing reliance on computer systems, the Internet and wireless networks such as Bluetooth and Wi-Fi, and due to the growth of "smart" devices, including smartphones, televisions and the various tiny devices that constitute the Internet of Things (IoT).

Most modern security systems and computer applications utilize some form of authentication technology. Authentication is the process of determining whether someone or something is, in fact, who or what it declares itself to be. Authentication is important because it enables individuals and organizations alike to keep data secure by permitting only authenticated users (or processes) to access protected resources, which may include computer systems, networks, databases, websites and other network-based applications or services.

User authentication is the verification of an active human-to-machine transfer of credentials required for confirmation of a user's authenticity. User authentication is performed in almost all human-to-computer interactions other than guest and automatically logged in accounts. Authentication authorizes human-to-machine interactions on both wired and wireless networks to enable access to networked and Internet-connected systems and resources.

Traditionally, user authentication has consisted of a simple user identification (user ID) and password combination. Authenticating a user with a user ID and a password is typically considered the most basic type of authentication, and it depends on the user knowing just two pieces of information: the user ID and the password. For example, during a login process, the user must provide a username and password in order to gain access to protected computing devices, operating systems, applications (e.g., email, web sites, etc.), databases, networks, etc.

Though passwords have been an accepted norm for authenticating users and providing access for many years, the conventional user ID and password authentication technique has proven inadequate in light of on-going technology-based advances in identity theft. For example, passwords are vulnerable to phishing or key-logging attacks by imposters, hacking or network sniffing, and even guessing by trial and error. Once exposed, user files and applications are open to undetected theft by copying as well as vandalism by deletion. Moreover, the entire account may be exposed at once because individually protecting each file and application with a unique password is not practical. Conventional encryption techniques to protect user files and applications are similarly vulnerable, especially when a cryptographic key is stored at an end point.

In order to combat the ongoing security threats, some systems have instituted increasing strength requirements for passwords. For example, users may be required to provide intricate and more complex passwords that include a combination of numbers, case-sensitive letters, and non-traditional and special characters. Requiring ever more complex passwords may improve security, but such passwords are generally difficult for the user to memorize, which may result in a user storing complex passwords in files, which are then also vulnerable. Also, it is very common for a user to have a single, default password so that they do not have to memorize and protect a slew of passwords. However, use of a single password is not recommended because all accounts are vulnerable to a single password interception. Moreover, even the most complex passwords are vulnerable to interception attacks, such as a man-in-the-middle attack or a keyboard sniffer.

Using layered security and multiple factors of authentication is gaining ground as a more secure method authentication to prevent fraud. Adding authentication factors to the authentication process typically improves security. Strong authentication (via multifactor authentication) usually refers to authentication that uses at least two or more factors, where those factors are of different types. An authentication factor represents some piece of data or attribute that can be used to authenticate a user requesting access to a system. The main authentication factors are knowledge, possession and inherence. Knowledge factors include all things a user must know in order to log in, including user names, passwords, personal identification numbers (PINs), personal-related information specific to the user, such as mother's maiden name, first pet name, place of honeymoon, or other responses, for example. Possession factors consist of anything a user must have in their possession in order to log in, which may include one-time password tokens as key fobs or smartphone apps, employee ID cards and SIM card-based mobile phones. Inherence factors may include any inherent traits the user has that are confirmed for login, such as biometrics (retina scans, iris scans, fingerprint scans, finger vein scans, facial recognition, voice recognition, hand geometry, and earlobe geometry, to name a few).

Two-factor authentication, for example, has improved the state of the art by requiring a user provide a knowledge factor (user ID and password) combined with a second authentication factor, either a possession factor or an inherence factor. For instance, a two-factor authentication technique may require the user to demonstrate possession of something, such as a smart phone, in addition to their user ID and password, where the user may be required to enter a verification code received via text message on a preregistered mobile phone, or a code generated by an authentication application. Three-factor authentication uses three authentication factors, usually a knowledge factor (password) combined with a possession factor (security token) and inherence factor (biometric). Systems that call for those three factors (knowledge, possession, and inherence) plus a location (geographic) or a time factor are considered examples of four-factor authentication.

Although multifactor authentication is clearly superior to the conventional user ID and password combination, it is imperfect. In particular, multifactor authentication (two-factor authentication, three-factor authentication, etc.) may be a nuisance for users because it requires more effort and involvement on the user's part, which may lead to attempts to minimize its frequency, possibly compromising its efficacy. Accordingly, the reliability of authentication is affected not only by the specific technologies and the manner in which they are implemented, but also the number of factors involved and subsequent burden imposed on the user.

SUMMARY

Traditional authentication depends on the use of a password file, in which user IDs are stored together with hashes of the passwords associated with each user. When logging in, the password submitted by the user is hashed and compared to the value in the password file. If the two hashes match, the user is authenticated. This approach to authentication has several drawbacks, particularly for resources deployed across different systems. For one thing, attackers who are able to access to the password file for a system can use brute force attacks against the hashed passwords to extract the passwords. Also, this approach would require multiple authentications for modern applications that access resources across multiple systems. Password-based authentication weaknesses have been addressed to some extent with stronger user names and password rules like minimum length and stipulations for complexity, such as including capitals and symbols. The recent implementation of layered security and multiple factors of authentication has addressed drawbacks of the conventional user ID and password authentication, but presents its own drawbacks. In particular, the additional effort and involvement required from a user to confirm each of the additional factors may be a nuisance, which may lead to attempts to minimize its frequency, possibly compromising its efficacy.

The present invention addresses the drawbacks associated with current authentication techniques. More specifically, the present invention provides a secure and easy-to-use authentication system that relies on a single trusted device associated with a user, such as a smartphone or other personal computing device, to facilitate strong and usable multifactor authentication. The use of a single trusted device provides an alternative and secure approach for authenticating users, without requiring the typical exchange of a user-entered credential, such as the traditional combination of username and password, at the time of authentication. The authentication approaches of the present invention are at least as strong as conventional multifactor authentication techniques, while being as easy to use as the traditional user ID and password combination.

For example, upon performing certain registration steps with the authentication system, a user's device will be established and recognized by the authentication system as a bonded or trusted device that is specific to the user. The system may rely upon an existing trusted credential for a one-time secure registration process of the device in order to establish the device as a bonded or trusted device. As part of registration of the device, one or more additional authentication factors may be linked with the bonded device. The additional authentication factors may include, but are not limited to, a QR code, a PIN, or a biometric factor (e.g., fingerprint, retina, or facial scan, or voice and/or speech recognition). It should be noted that there are a wide variety of possible factors that can used with the present system, in conjunction with the bonded device and the following description is not limited to the authentication factors noted previously herein. Once registered, the bonded device can be relied upon as a required proof of identity for authentication purposes so as to grant user access to a protected resource without requiring that the user enter a username or other identifying information, such as an email address or the like, in order to gain access. Accordingly, one of the main advantages of the present invention is that there is no need for a user to provide the typical identifying information (i.e., username or ID) for all future authentication sessions, thereby avoiding the pitfalls of traditional authentication, in which user-provided information could be retained in a device's history, and/or recorded by a keylogger or other malware.

For example, a user may wish to gain access to a protected resource, which may include computer systems, networks, databases, websites and other network-based applications or services having secure data. The protected resource may be referred to as a relying party. The relying party utilizes, or otherwise relies upon, an access management system which generally serves as an identity provider and an authentication authority. In particular, the access management system may generally provide initial registration services, as well as ongoing authentication services to ensure that any user attempting to access the relying party resources is in fact a recognized and trusted user. It should be noted that the relying party may also be referred to herein as a service provider, which more specifically describes a relying party that is configurable by a user to use the user's choice of an access management system, while the relying party may generally refer to an entity that is external to the access management system that relies on the access management system alone to establish an authentication assertion. The relying party (service provider) may include any entity that has an online presence (i.e., available for a user to access via an online account) and provides some form of access to, data, which the relying party protects via authentication and authorization processes, namely authentication services provided by the access management system.

Upon a user attempting to access and initiate a session with the relying party via a personal computing device, such as a PC, tablet, or even a smartphone, the relying party may communicate with the access management system indicating that an attempt has been made to access the relying party resources. For example, a user may navigate, via their computing device, to a relying party website, at which point, the user will be provided with a user interface associated with the access management system.

In the event that the user is not yet registered (i.e., the user and/or computing device is not recognized), the user will need to register with the access management system services (a requirement in order to access the relying party resources). In one embodiment, the user may be invited to complete registration, in which the user may be prompted to provide certain information and credentials as part of the initial registration. Such information may include, but is not limited to basic information, including name, mailing address, email address, phone number, and the like, and may further include login credentials, such as username and password. It should be noted that, in some embodiments, an administrator associated with the relying party may previously initiate user registration with the access management system by simply registering the user's phone number and/or email address, for example. As such, once the user attempts to login, they will be prompted to provide their phone number and/or email address, which, upon successful entry, will be matched with the data provided by their administrator, thereby verifying identity.

Accordingly, at this point, the user is then invited to install certain access management system software application(s) on a personal computing device that the user chooses to be used for authentication/verification purposes, such as a smartphone or other device such as a dedicated piece of authentication hardware or a personal laptop. The access management software application may include user agent(s) to be used for completing the registration process and used in future authentication sessions (i.e., future sessions or events in which the user is authenticated and granted access to the protected resource(s)). Upon installation, an additional registration phase is initiated, which involves the formation of a seed secret specific to that user and the associated smartphone which is based, at least in part, on a Time-based One-time Password (TOTP) algorithm, such as the Internet Engineering Task Force standard RFC 6238, for example. In particular, this phase of the registration process involves a peer-to-peer exchange of secrets among parties involved, including the access management system, the user, and the relying party. The registration session essentially relies on a bond of trust, in which each party has the shared secret such that either party can authenticate the other. The access management system's role as a trusted agent and intermediary in the exchange ensures the registration process is secure.

For example, in one embodiment, the user's smartphone may include a user agent in the form of a code generator (provided via the access management system software) running natively on the smartphone. An introduction or initial candidate secret is generated, via the access management system, and sent to the user's smartphone. This initial candidate secret is intended to be relayed to the code generator, either by displaying machine-readable data, in the form of a QR code, for example, or some other communicative means (via email or SMS text messaging service which contains a link to the chosen device and then opened with the code generator). The user then actively scans the QR code or selects the link, and, in turn, a reciprocal secret is transmitted back to the access management system. The access management system updates a user's profile with reciprocation against the user credentials that the smartphone was originally registered to and further transmits a canonical secret back to the smartphone. The canonical secret generally comprises two pieces of data, including a token, which includes built-in expiry date in which user has a grant period during which they can carry out authentication as determined by organization/enterprise, as well as a random confirmation code (e.g., six-digit code), so as to avoid fly-by scan by a passerby or a person looking to steal identity (displayed on the smartphone) and which must be entered during registration period.

The token is stored on the smartphone and used for authentication purposes in future sessions. In particular, the smartphone may be used as a token repository, wherein the token replaces the need to provide credentials (i.e., username and password) for any future logins when the users wishes to access the protected resource. For example, as a result of the reciprocal process (i.e., reciprocal, peer-to-peer exchange of secrets), a bonded or trusted personal computing device (i.e., the user's smartphone) is established and registered to the specific user. Future authentication sessions will take place each time a user attempts to access protected resources associated with that specific relying party. More specifically, authentication sessions will build on the tripartite contract of the three parties (the access management system, the user, and the relying party) to reaffirm multi-factor authentication in real time. In other words, there is essentially a three-way conversation occurring during an authentication process, in which one party communicates with another party, which then shares secret(s) with another party to complete an authentication loop (i.e., the access management system directly communicates with both the user and the relying party, sharing secrets therebetween, while the user and relying party generally do not communicate directly with one another). Accordingly, the access management system serves as a trusted agent and intermediary in the exchange of information between all parties.

In some embodiments, the authentication process may include a multi-part, unidirectional data transfer between the three parties for a secure authenticated session. The first instance is in the form of a request session, in which the relying party, upon a user attempting to access and initiate a session with the relying party, requests a unique authentication session of the access management system. The session information may include a public component, which serves as a tender to realize (made available for an as-yet unknown user agent of the computing device to "realize"), and a private component, which is a token shared between the access management system and the relying party to establish provenance, and is required by any exchange of status information for the session. The next part of the authentication process includes a detect session, in which the user agent of the smartphone detects the public session identifier through some mechanism (i.e., such as scanning a QR code displayed via a user interface of a computer monitor, providing biometric input, such as fingerprint scan or spoken phrase, or inputting a PIN). A realize session follows, in which the user agent informs the access management system that the session is being realized by a pre-registered user, and sends identifying secrets for that specific user. The final part of the authentication session includes an enquire session, in which the relying party determines the status of a session by enquiring the access management system. The session is identified by the public component, and the request must also include the private component to establish provenance. Upon a successful authentication, a user is able to progress on to relying party's interface and access protected resource that relying party is offering.

It should be noted that once a trusted or bonded device has been established, other authentication factors can be added. A bonded device may generally refer to a device that essentially holds a single user's registration details and verified, completed reciprocation, and that has been issued a token to use the authentication services for an agreed period. The additional authentication factor may include, but is not limited to, a QR code, a PIN, or a biometric factor (e.g., fingerprint, retina, or facial scan, or voice and/or speech recognition). For example, in some embodiments, voice and/or speech recognition may be used, such that, instead of QR code for authentication, certain words derived from a secret and a TOTP may be used.

For example, upon attempting access to a protected resource, a number of words may be displayed to the user, thereby prompting the user to narrate, via their smartphone, the displayed words to gain access to the protected resource. In other embodiments, a specific question could be displayed to the user, thereby prompting the user to speak and provide a verbal answer to the question. Upon successful narration or verbal response, the user may gain access to the protected resource. The voice recognition system is configured to not only correlate the spoken words with the displayed words to ensure a correct match (i.e., provide speech recognition functions), but further perform voice recognition by correlating the spoken words with a stored voiceprint profile of the user to ensure that an authorized user is truly the one attempting to gain access.

As a result of the reciprocal process (i.e., reciprocal, peer-to-peer exchange of secrets), a bonded or trusted device (i.e., the user's smartphone) is established and registered to the specific user. This act of reciprocation for forming a trust bond overcomes the drawbacks of current systems and methods. The promotion of a dual session during registration creates a trust environment and forms a common secret never shown in public and never shared again during future authentication sessions. In particular, authentication carried out via the given bonded device naturally supports a multiple factor authentication paradigm (something the user owns, together with the biometric or PIN authentication) without requiring any direct manual credential entry on the user's part, either a username or password. Furthermore, the bonded device is not required to be linked directly to the computer on which they authenticate via any mechanism (such as NFC, Bluetooth, Wifi or by USB cable) nor does the bonded device communicate with the relying party, but instead relies on a secure, time-synchronized token exchange with the access management system. Accordingly, the present invention provides a secure and easy-to-use system for employing a single chosen device (such as a smartphone) as sole required proof of identity for all future authentication purposes, thereby providing credential-less or near credential-less authentication and verification techniques. In particular, the bonded device is used to establish the initial user context for future authentication sessions.

Accordingly, one of the main advantages of the present invention is that there no need for a user to provide the typical identifying information (i.e., username or ID) for all future authentication sessions, thereby avoiding the pitfalls of traditional authentication. In other words, establishing the bonded device essentially replaces the need for a user to provide some sensitive, identifying information, specifically a username or ID, thereby protecting against phishing. The bonded device is used, in conjunction with the access management system authentication services, to establish initial user context during authentication sessions, in which the user is never required to enter their username or ID, but is able to complete realization of an authentication session and provide a password and/or other factors that may be required (i.e., SMS/TOTP verification or the like) to complete authentication and ultimately gain access. The benefit of this approach is that the username may not be intercepted and/or is never revealed, thereby making it difficult to exploit a password, even if it were known. Another benefit is that a password can then be validated against the never-revealed username, and so might still use a third party credentialing system on the backend, which ensures the user has knowledge aforethought of the current password, and so benefits from the password change policies enforced on that backend system.

BRIEF DESCRIPTION OF THE DRAWINGS

Features and advantages of the claimed subject matter will be apparent from the following detailed description of embodiments consistent therewith, which description should be considered with reference to the accompanying drawings.

Figure 1:
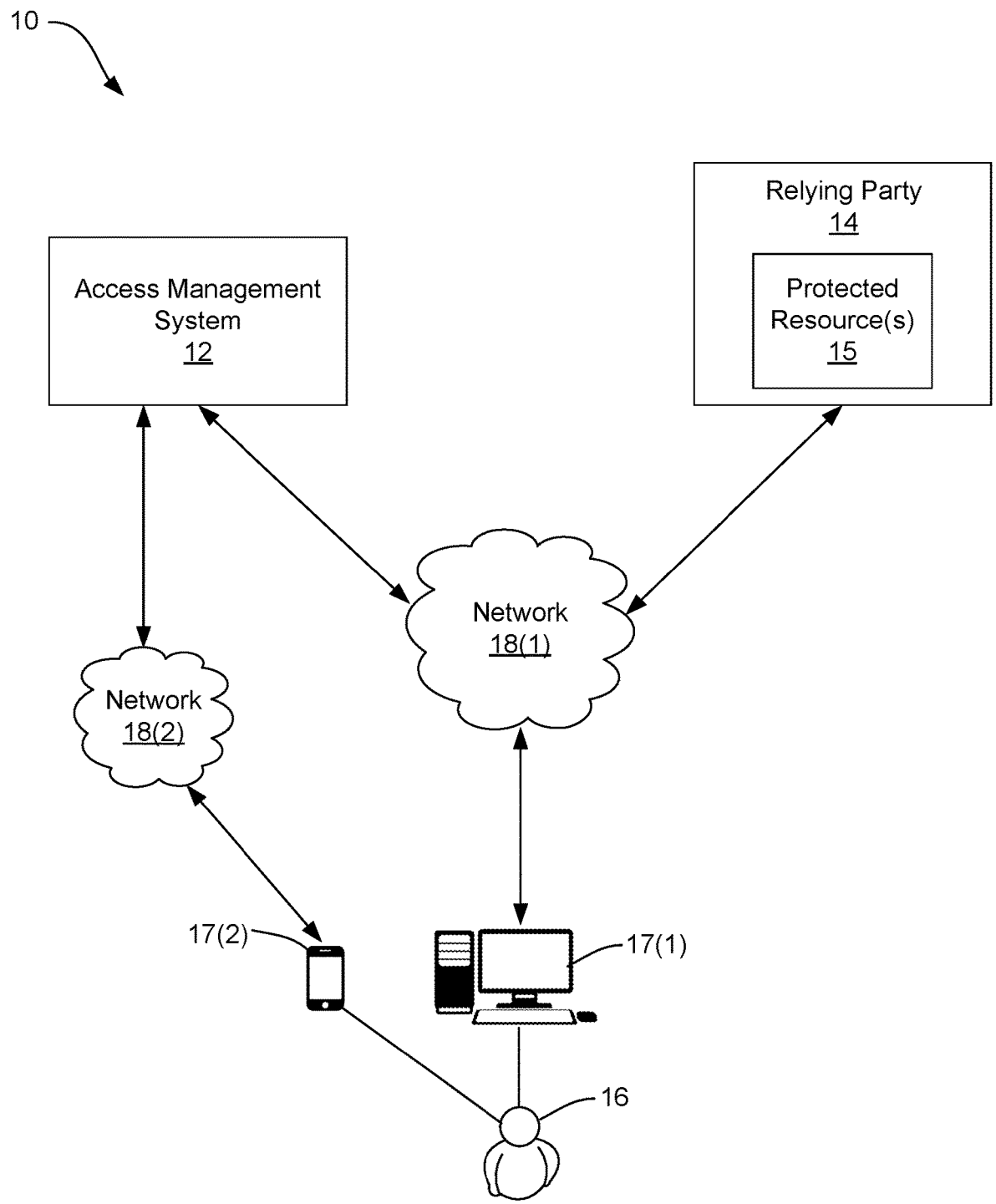
FIG. 1 is a block diagram illustrating an authentication system consistent with the present disclosure.

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to a secure and easy-to-use authentication system for employing a single chosen user device, such as a smartphone, as the sole required proof of identity for authentication purposes for granting user access to a protected resource after an initial, one-time secure registration process. The system utilizes an existing trusted credential for a one-time secure registration process linked with an additional authentication factor, such as a QR code, a PIN, or a biometric factor (e.g., fingerprint, retina, or facial scan, or voice and/or speech recognition).

Traditionally, username and password combinations have been used to authenticate a user logging into a secure system such as a website. This technique is fraught with problems. For example, this authentication technique relies on a user having to remember their password. Sometimes systems place certain constraints on passwords in an effort to make the system more secure (e.g. requiring a certain number of characters, certain types of characters, etc.) and, while such constraints may be helpful to make the system more secure, they may also make the created password more difficult for a user to remember.

Additionally, password-based authentication is also susceptible to attack. For example, keylogging software may be installed on a device by a hacker or fraudster and may be used to secretly monitor keystrokes, including passwords. Since passwords are often sent from one computer to another (e.g. from the computer that a user is typing the password on to a computer which receives the password to authenticate the user), passwords are also susceptible to a sniffing attack (e.g., capture and analysis of packets of data flowing over a network). For example, packet sniffing software may be used by a fraudster connected to a user's Wi-Fi network to capture passwords sent by the user over the network.

Passwords are also susceptible to an attack directed at the secure system itself. For example, a brute force attack consists of an automated hacker program constantly attempting logins using a single user-name and millions of password combinations. There are numerous examples in recent history where a hacker has gained access to a secure system through vulnerabilities such as newly discovered weaknesses in security applications (such as openSSL), causing the secure system to request that users change their passwords.

The present invention addresses the drawbacks associated with current authentication techniques, including the traditional user ID and password authentication approach as well as newer multifactor authentication techniques. In particular, the systems and methods of the present invention provide alternative and secure approaches for authenticating users, without requiring the typical exchange of a user-entered credential, such as a password and/or username, at the time of authentication. The authentication approaches of the present invention are at least as strong as multifactor authentication techniques, while being as easy to use as the traditional user ID and password combination.

FIG. 1 is a block diagram illustrating one embodiment of an exemplary system or architecture 10 consistent with the present disclosure. As shown, the system 10 includes an access management system 12 providing authentication services for a relying party 14. More specifically, the access management system 12 provides alternative and secure approaches for authenticating a user 16, without requiring the typical exchange of a user-entered credential, such as a password and/or username, at the time of authentication.

The access management system 12 may be embodied on an internet-based computing system/service, such as a cloud-based service, for example. The access management system 12 is configured to communicate and exchange data with the relying party 14, as well as one or more computing devices 17(1) and 17(2) associated with a user 16 over one or more networks 18(1) and 18(2). In the present context, the user 16 may include any person attempting to access protected resource(s) 15 provided by, or otherwise associated with, the relying party 14. The access management system 12 generally provides authentication and verification services for the relying party 14 so as to authenticate the user (i.e., verify the supposed identity of the user) in the event that the user attempts to access one or more protected resources 15 associated with the relying party 14.

Each of the networks 18(1) and 18(2) may represent, for example, a private or non-private local area network (LAN), personal area network (PAN), storage area network (SAN), backbone network, global area network (GAN), wide area network (WAN), or collection of any such computer networks such as an intranet, extranet or the Internet (i.e., a global system of interconnected networks upon which various applications or service run including, for example, the World Wide Web). In alternative embodiments, the communication path between any one of the computing devices 17(1), 17(2), the access management system 12, and the relying party 14, may be, in whole or in part, a wired or wireless connection.

Each of the networks 18(1) and 18(2) may be any network that carries data. Non-limiting examples of suitable networks that may be used as network 18 include Wi-Fi wireless data communication technology, the internet, private networks, virtual private networks (VPN), public switch telephone networks (PSTN), integrated services digital networks (ISDN), digital subscriber link networks (DSL), various second generation (2G), third generation (3G), fourth generation (4G) cellular-based data communication technologies, Bluetooth radio, Near Field Communication (NFC), any version of IEEE 802.11 transmission protocol standards, other networks capable of carrying data, and combinations thereof. In some embodiments, network 18 is chosen from the internet, at least one wireless network, at least one cellular telephone network, and combinations thereof. As such, the network 18 may include any number of additional devices, such as additional computers, routers, and switches, to facilitate communications. In some embodiments, each of the networks 18(1) and 18(2) may be or include a single network, and in other embodiments each of the networks 18(1) and 18(2) may be or include a collection of networks.

It should be noted that cryptographic protocols, designed to provide communications security over each of the networks 18(1) and 18(2), may be relied upon in the present system at all times. For example, transport layer security (TLS) and/or secure sockets layer (SSL) encryption protocols may be used to secure all communications between the access management system 12, the relying party 14, and the one or more computing devices 17(1) and 17(2) associated with the user 16 over the networks 18(1) and 18(2).

As shown, the system 10 may include at least a first network 18(1) over which the access management system 12, relying party 14, and client computing device 17(1) (represented as a desktop PC) generally communicate and a second network 18(2) separate from the first network 18(1) over which the access management system 12 and the mobile computing device (i.e., smartphone or other mobile device) 17(2), which becomes a bonded device, communicate with one another. Accordingly, in some embodiments, the bonded device does not need to be connected to either of the client computing device 17(1) or the relying party 14 in order to communicate and exchange information with the access management system 12, as it relies on a separate, secondary network 18(2). As described in greater detail herein, this configuration strengthens the overall architecture of the authentication system 10, as the bonded device 17(2) does not transmit nor receive anything to or from the relying party 14 or the client computing device 17(1) (which initially accesses the relying party 14). Rather, the bonded device 17(2) communicates only with the access management system 12 directly, thereby decreasing the risk of security breach.

Figure 2:
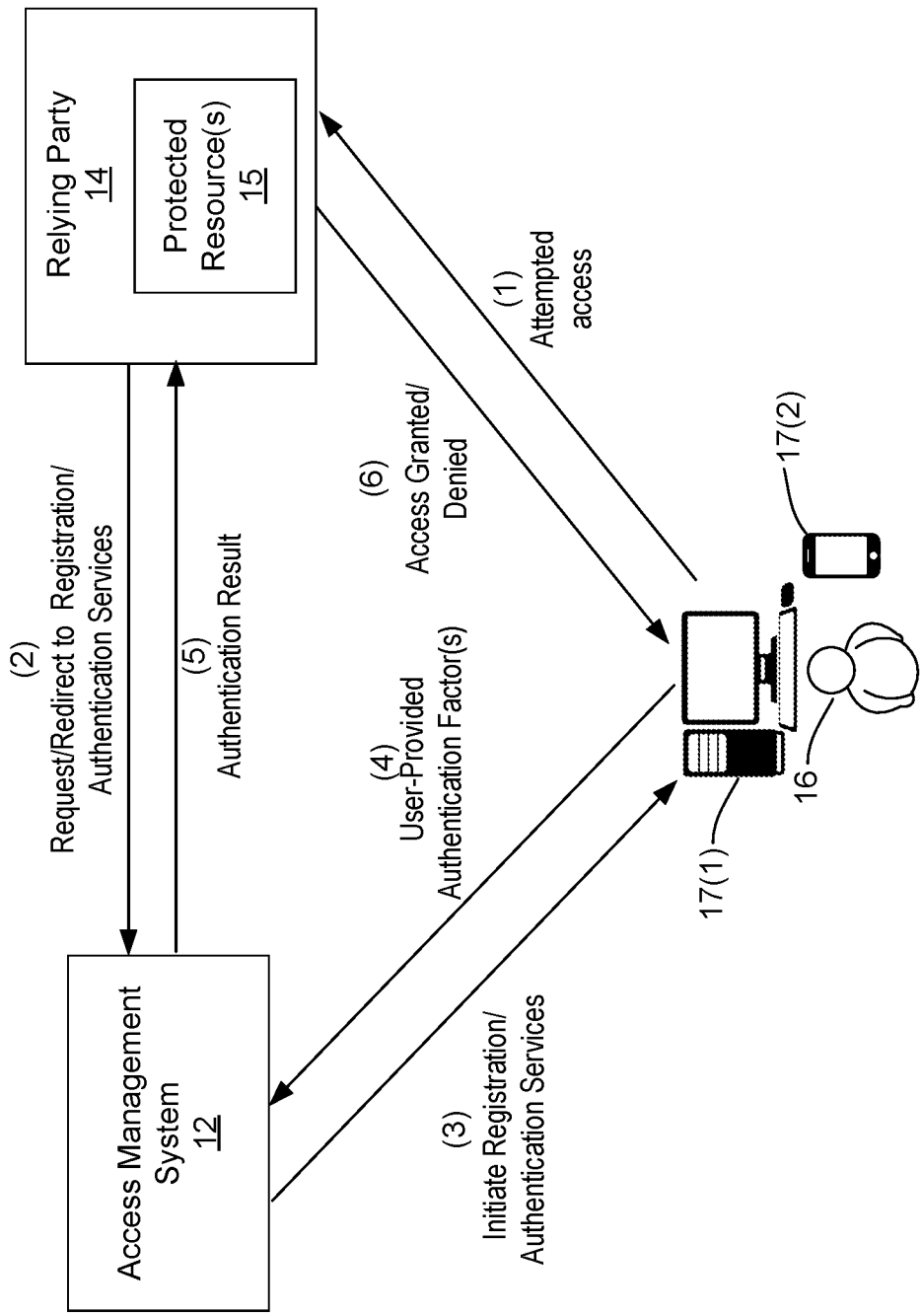
FIG. 2 is a block diagram illustrating a general flow of the registration and authentication processes in accordance with the present invention.

FIG. 2 is a block diagram illustrating a general flow of the registration and authentication processes in accordance with the present invention. For example, a user 16 may wish to gain access to a protected resource 15, which may include computer systems, networks, databases, websites and other network-based applications or services having secure data. In the illustrated embodiment, the protected resource 15 is available via a relying party 14. The relying party 14 utilizes the access management system 12, which generally serves as an identity provider and an authentication authority. In particular, the access management system 12 may generally provide initial registration services, as well as ongoing authentication services to ensure that any user 16 attempting to access the relying party's resources is in fact a recognized and trusted user.

It should be noted that the relying party may also be referred to herein as a service provider, which more specifically describes a relying party that is configurable by a user to use the user's choice of an access management system, while the relying party may generally refer to an entity external to the access management system that relies on the access management system alone to establish an authentication assertion. The relying party (service provider) may include any entity having an online presence (i.e., available for a user to access via an online account) and providing some form of access to data, which the relying party protects via authentication and authorization processes, namely authentication services provided by the access management system.

In some embodiments, a user 16 may attempt to access and initiate a session with the relying party via a personal computing device 17(1). In the event that the relying party 14 is employing the authentication services provided by the access management system 12, the relying party 14 may then communicate with the access management system 12 indicating that an attempt has been made to access the relying party's protected resources. For example, a user 16 may navigate, via their computing device 17(1), to a relying party website, at which point, the user 16 may automatically be redirected to a user interface associated with the access management system 12. It should be noted that the relying party 14 utilizes the access management system services for authenticating a user (i.e., verifying that the user is in fact who they claim to be) prior to granting access to any protected resources hosted by the relying party 14. In other words, the relying party 14 employs those services provided by the access management system 12 and trusts the authentication provided by the access management system 12 prior to granting access to a user.

The access management system 12 may then initiate either a registration session or an authentication session with the user 16 depending on whether the user 16 is already registered with the access management system services. In the event that the user 16 is not registered (i.e., the user and/or computing device is not recognized), the user 16 will need to register with the access management system services (a requirement in order to access the relying party resources) via an initial registration session, which will be described in greater detail herein. In the event that the user 16 is already registered (i.e., the user and/or computing device is recognized), the access management system 12 carries out an authentication session, in which a chosen user device, such as a smartphone 17(2), which was initially registered and established as a trusted or bonded device, is used as proof of identity for authentication purposes (i.e., the user is not required to provide a username or ID, such as their email address or name) but rather need only interact with their smartphone 17(2) to provide a separate requested authentication factor(s) during the authentication session. In other words, the bonded device, once registered, essentially provides secure confirmation of the user's identity (i.e., replaces the need for the user to provide their username or ID), thereby obscuring the user identity and preventing exposure to phishing attacks, while still allowing for the user to provide at least one additional credential (i.e., password, PIN, biometric data, etc.). Upon receipt of the user-provided authentication factor(s), the access management system 12 provides the authentication results to the relying party 14 and, based on those results, the relying party 14 may, or may not, grant the user 16 access to the protected resource(s) 15.

Figure 3:
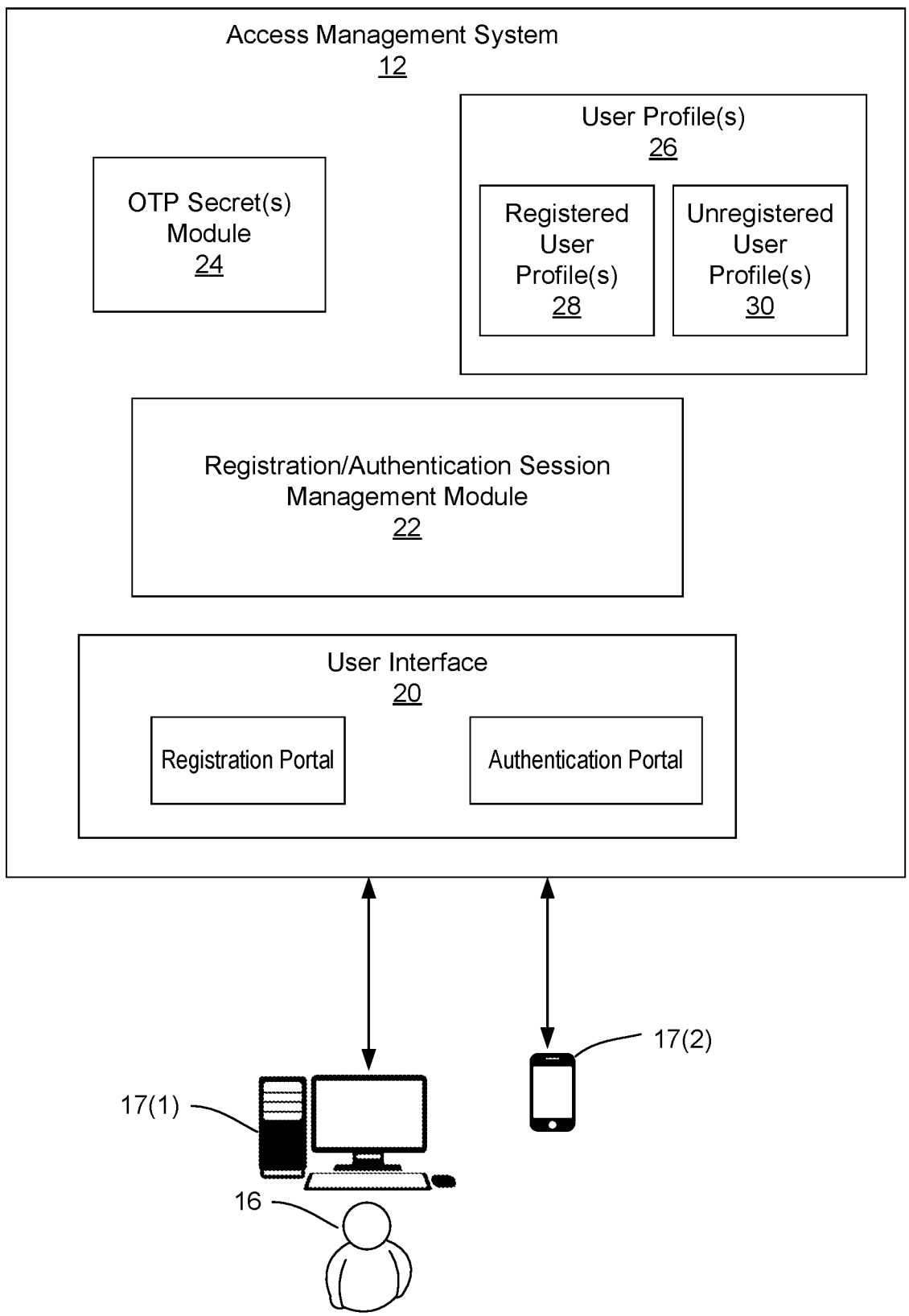
FIG. 3 is a block diagram illustrating the access management system in greater detail.

FIG. 3 is a block diagram illustrating the access management system 12 in greater detail. The access management system 12 includes a user interface 20, which, depending on the state of the user (i.e., registered or unregistered) will provide the user 16, via a display on the user's computing device(s) 17(1), 17(2), either a registration portal or an authentication portal providing the respective session. The access management system 12 further includes a registration/authentication session management module 22, which essentially carries out the registration and authentication sessions by way of managing the collection and transmission of data (i.e., data exchange) and the initialization of the registration and authentication sessions. The access management system 12 further includes a one-time password (OTP) module 24. OTP, also known as one-time PIN or dynamic password, is a password that is valid for only one login session or transaction, on a computer system or other digital device. In the instant application, the OTP module 24 may be used for the generation of secrets to be sent to the user during the registration session as part of a peer-to-peer exchange of secrets between the access management system 12 and the chosen personal computing device (i.e., smartphone 17(2)) to be registered as the bonded device for all future authentication sessions. The access management system 12 may further include, or have access to, one or more databases or repositories, most notably for storing user profiles 26. The user profile database may include registered user profiles 28 and unregistered user profiles 30. The user profiles include user-specific data, such as, for example, basic information, including the user's name, mailing address, email address, phone number, and the like, and may further include login credentials, such as username and password. Post registration, a registered user profile 28 may further include a registered canonical secret created during the registration process which is specific to that user and further stored on the user's smartphone 17(2), as will be described in greater detail herein. Furthermore, additional user data may be stored within a user profiles, including, but not limited to, registered biometric data (fingerprint, retina, or facial scan, or voiceprint).

Figure 4A:
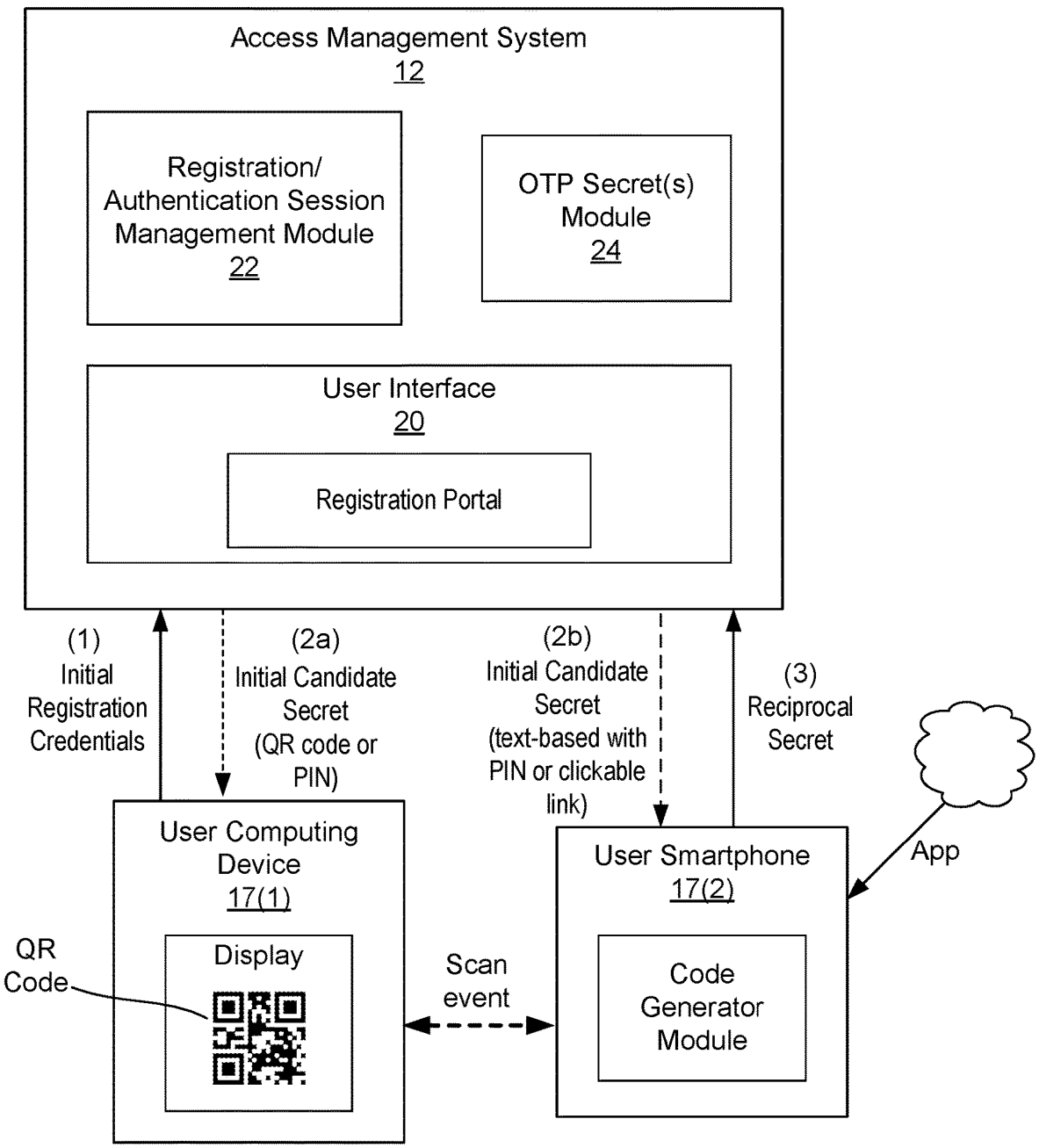
FIGS. 4A and 4B are block diagrams illustrating an exemplary registration session between a user computing device, a user smartphone, and the access management system for registering a user with access management system services, which is required in order to undergo future authentication sessions so as to access a relying party's protected resources.
Figure 4B:
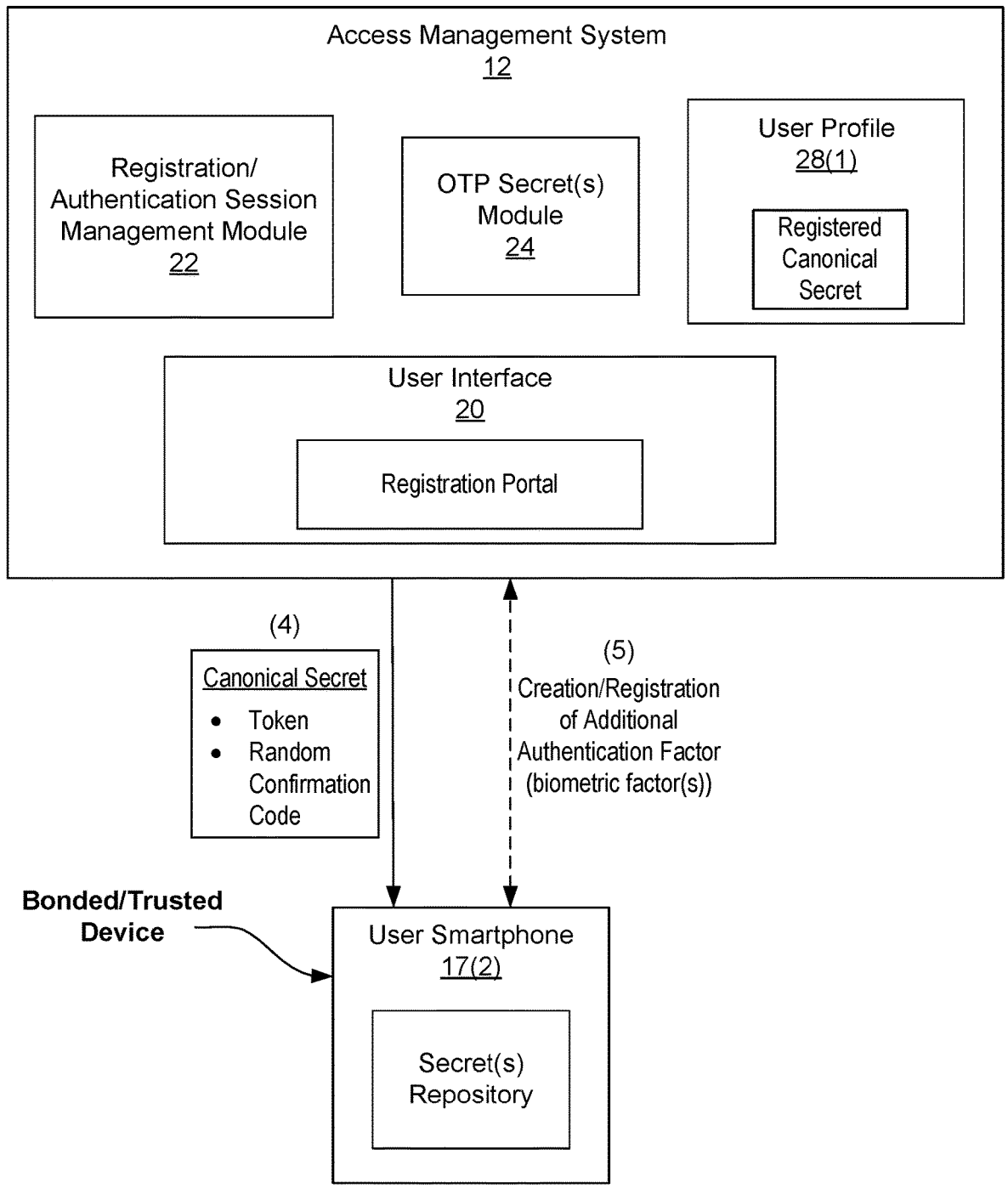

FIGS. 4A and 4B are block diagrams illustrating an exemplary registration session between a user computing device 17(1), a user smartphone 17(2), and the access management system 12 for registering a user with access management system services, which is required in order to undergo future authentication sessions so as to access a relying party's protected resources.

As previously described, upon a user attempting to access and initiate a session with the relying party 14 via a personal computing device 17(1), the relying party 14 may communicate with the access management system 12 indicating that an attempt has been made to access the relying party resources 15. For example, a user may navigate, via their computing device 17(1), to a relying party 14 website, at which point, the user may be redirected to a user interface 20 associated with the access management system 12.

In the event that the user is not yet registered (i.e., the user and/or computing device is not recognized by the access management system 12), the user will need to register with the access management system services (a requirement in order to access the relying party resources). In one embodiment, the user may be invited to complete registration, in which the user may be prompted to provide certain information and credentials as part of the initial registration. Such information may include, but is not limited to basic information, including name, mailing address, email address, phone number, and the like, and may further include login credentials, such as username and password. It should be noted that, in some embodiments, an administrator associated with the relying party 14 may previously initiate user registration with the access management system 12 by simply registering the user's phone number and/or email address, for example. As such, once the user attempts to login, they will be prompted to provide their phone number and/or email address, which, upon successful entry, will be matched with the data provided by their administrator, thereby verifying identity.

Accordingly, at this point, the user is then invited to install certain access management system software application(s) on a personal computing device that the user chooses to be used for authentication/verification purposes, such as a smartphone 17(2). The access management software application (hereinafter referred to as the "app") may include user agent(s) to be used for completing the registration process and used in future authentication sessions (i.e., future sessions or events in which the user is authenticated and granted access to the protected resource(s)). Upon installation, an additional registration phase is initiated, which involves the formation of a seed secret specific to that user and the associated smartphone which is based, at least in part, on a Time-based One-time Password (TOTP) algorithm. The Time-based One-Time Password algorithm (TOTP) is an extension of the HMAC-based One-time Password algorithm (HOTP) generating a one-time password by instead taking uniqueness from the current time. It has been adopted as Internet Engineering Task Force standard RFC 6238. In particular, this phase of the registration process involves a peer-to-peer exchange of secrets among parties involved, including the access management system 12, the user 16, and the relying party 14. The access management system's role as a trusted agent and intermediary in the exchange ensures the registration process is secure.

For example, in one embodiment, the user's smartphone 17(2) may include a user agent in the form of a code generator (provided via the access management system software) running natively on the smartphone. An introduction or initial candidate secret is generated, via the access management system 12, and sent to the user's smartphone. This initial candidate secret is intended to be relayed to the code generator, either by displaying machine-readable data, in the form of a QR code, for example, or some other communicative means (via email or SMS text messaging service which contains a link to the chosen device and then opened with the code generator). The user then actively scans the QR code (via the smartphone 17(2)) or selects the link (via the smartphone 17(2)), and, in turn, a reciprocal secret is transmitted back to the access management system 12. The QR code is an encapsulation of an otpauth URL with a specific extension for the reciprocation endpoint. This is distinguished from a conventional otpauth URL in that there is a "reciprocal" query parameter that contains an endpoint to which the client should send a plain-text reciprocal secret. The endpoint itself has a token in the path that holds an encryption of the user email address and account code, for example, which is used to verify the owner of the reciprocated secret. Once the user scans the QR code, a secret is sent to the endpoint in question.

The access management system 12 updates a user's profile with reciprocation against the user credentials that the smartphone 17(2) was originally registered to and further transmits a canonical secret back to the smartphone 17(2), which is the definitive secret to be used in future OTP code generation. The canonical secret generally comprises two pieces of data, including a token, which includes built-in expiry date in which user has a grant period during which they can carry out authentication as determined by the organization/enterprise of the relying party, as well as a random confirmation code (e.g., six-digit code), so as to avoid fly-by scan by a passerby or a person looking to steal identity (displayed on the smartphone) and which must be entered during registration period. The token is stored on the smartphone 17(2) and used for authentication purposes in future sessions. The above described process of generating a canonical secret may be referred to herein as a Reciprocal TOTP (RTOTP) scheme. As the canonical secret has been exchanged peer-to-peer, it is considered more secure than standard TOTP and ensures a bonded-device metaphor (i.e., the secret cannot co-exist on any other device, since reciprocation is allowed only once).

It should be noted that, in some embodiments, an additional aspect of the registration process is a key exchange (certificate exchange) between the access management system 12 and the smartphone 17(2) to thereby improve the security of registration. In particular, the system 10 may utilize public-key cryptography, or asymmetric cryptography, in which the smartphone 17(2) can generate a pair of keys: a public key and a private key, and send the public key to the access management system 12 while storing the private key on a hardware-backed keystore on the smartphone 17(2), which is described in greater detail herein with reference to FIG. 6. The system 10 can then rely on attestation for assertion that the public key is provided from a valid, secure hardware-backed keystore. The key exchange initiated by the user agent provides an additional security measure for the registration and authentication processes in that, there is a chance that a rogue malware agent on the smartphone 17(2) might access the canonical secret if the user agent software is not well written. That slight chance of security breach is effectively reduced to none by sending a public key from the smartphone 17(2) with a hardware-backed keystore (so the private key can never leave the smartphone 17(2) or even be accessed by app memory).

It should be noted that, in another embodiment, the registration process may be mediated mostly, or entirely, on the user agent of the smartphone 17(2). For example, a user may navigate to a relying party 14, as previously described, in which the relying party 14 receives a public QR code and access secret, as previously described, and, once determined that the user is not registered, the unregistered user installs the app and scans the typical session QR code as the relying party 14 sends "enquire-session" polling requests. At this point, the user agent has no prior reciprocation and thus sends a registration request directly to the access management system 12. The user agent will prompt the user for a user identifier (i.e., username or ID), in which the user will enter this information via their smartphone for the first and only time, together with any other additional credentials that the access management system 12 requires, such as a password and any preexisting authentication factors (i.e., biometric input, such as fingerprint scan, retina scan, voiceprint, etc.). It should be noted that, in some embodiments, additional steps may be required during the registration process, such as the access management system 12 sending a confirmation email if the identifier is expected to be an email address, with an activation link. In some embodiments, registration may also require an exchange of funds. The access management system 12 now responds with the user identifier to the relying party 14, who is still polling away with "enquire-session" in the background. The main advantage of this variant of the registration process is that no user identifier (i.e., username or ID) is transmitted between the smartphone 17(2) and the relying party 14, as the registration process only involves direct communication between the smartphone 17(2) and the access management system 12 (over the second network 18(2)). Accordingly, there is no need to display a separate registration UI on the same machine, even by redirection to authentication pages, thereby avoiding keylogging and/or phishing threats.

Figure 5:
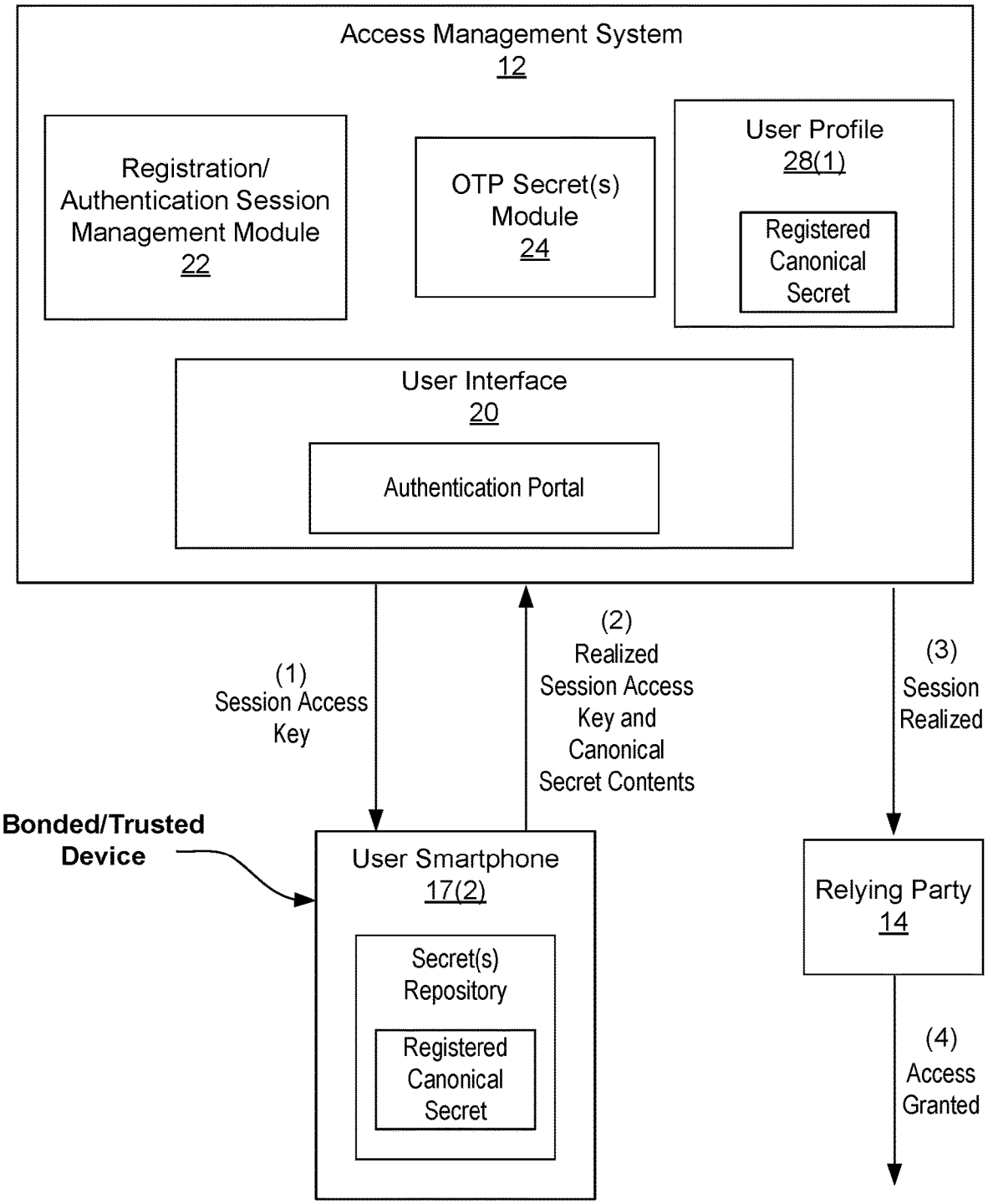
FIG. 5 is a block diagram illustrating an exemplary authentication session including a peer-to-peer exchange establishing a tripartite contract when all three parties establish secure exchange of expected information.

FIG. 5 is a block diagram illustrating an exemplary authentication session including a peer-to-peer exchange establishing a tripartite contract when all three parties establish secure exchange of expected information. In particular, the smartphone 17(2) may be used as a token repository, wherein the token replaces the need to provide credentials (i.e., username and password) for any future logins when the users wishes to access the protected resource. For example, as a result of the reciprocal process (i.e., reciprocal, peer-to-peer exchange of secrets), a bonded or trusted personal computing device (i.e., the user's smartphone) is established and registered to the specific user. Future authentication sessions will take place each time a user attempts to access protected resources associated with that specific relying party. More specifically, authentication sessions will build on the tripartite contract of the three parties (the access management system, the user, and the relying party) to reaffirm multi-factor authentication in real time. In other words, there is essentially a three-way conversation occurring during an authentication process, in which one party communicates with another party, which then shares secret(s) with another party to complete authentication loop.

In some embodiments, the authentication process may include a multi-part, unidirectional data transfer between the three parties for a secure authenticated session. The first instance is in the form of a request session, in which the relying party 14, upon a user 16 attempting to access and initiate a session with the relying party, requests a unique authentication session of the access management system. The session information may include a public component, which serves as a tender to realize (made available for an as-yet unknown user agent of the computing device to "realize"), and a private component, which is a token shared between the access management system and the relying party to establish provenance, and is required by any exchange of status information for the session. The next part of the authentication process includes a detect session, in which the user agent of the smartphone detects the public session identifier through some mechanism (i.e., such as scanning a QR code displayed via a user interface of a computer monitor, providing biometric input, such as fingerprint scan or spoken phrase, or inputting a PIN). A realize session follows, in which the user agent informs the access management system that the session is being realized by a pre-registered user, and sends identifying secrets for that specific user. The final part of the authentication session includes an enquire session, in which the relying party determines the status of a session by enquiring the access management system. The session is identified by the public component, and the request must also include the private component to establish provenance. Upon a successful authentication, a user is able to progress on to relying party's interface and access protected resource that relying party is offering.

It should be noted that once a trusted or bonded device has been established, other authentication factors can be added. The additional authentication factor may include, but is not limited to, a QR code, a PIN, or a biometric factor (e.g., fingerprint, retina, or facial scan, or voice and speech recognition). For example, in some embodiments, voice and/or speech recognition may be used, such that, instead of QR code for authentication, certain words derived from a secret and a TOTP may be used. For example, upon attempting access to a protected resource, a number of words may be displayed to the user, thereby prompting the user to narrate, via their smartphone, the displayed words to gain access to the protected resource. Upon successful narration, the user may gain access to the protected resource. The voice recognition system is configured to not only correlate the spoken words with the displayed words to ensure a correct match (i.e., provide speech recognition functions), but further perform voice recognition by correlating the spoken words with a stored voiceprint profile of the user to ensure that an authorized user is truly the one attempting to gain access.

As a result of the reciprocal process (i.e., reciprocal, peer-to-peer exchange of secrets), a bonded or trusted device (i.e., a smartphone) is established and registered to the specific user. This act of reciprocation for forming a trust bond overcomes the drawbacks of current systems and methods. The promotion of a dual session during registration creates a trust environment and forms a common secret never shown in public and never shared again during future authentication sessions. In particular, authentication carried out via the given bonded device naturally supports a multiple factor authentication paradigm (something the user owns, together with the biometric or PIN authentication) without requiring any direct manual credential entry on the user's part: either a username or password. Furthermore, the bonded device is not required to be linked directly to the computer on which they authenticate via any mechanism (such as NFC, Bluetooth, Wifi or by USB cable), but instead relies on a secure, time-synchronized token exchange with the access management system. Accordingly, the present invention provides a secure and easy-to-use system for employing a single chosen device (such as a smartphone) as sole required proof of identity for all future authentication purposes, thereby providing credential-less or near credential-less authentication and verification techniques.

Figure 6:
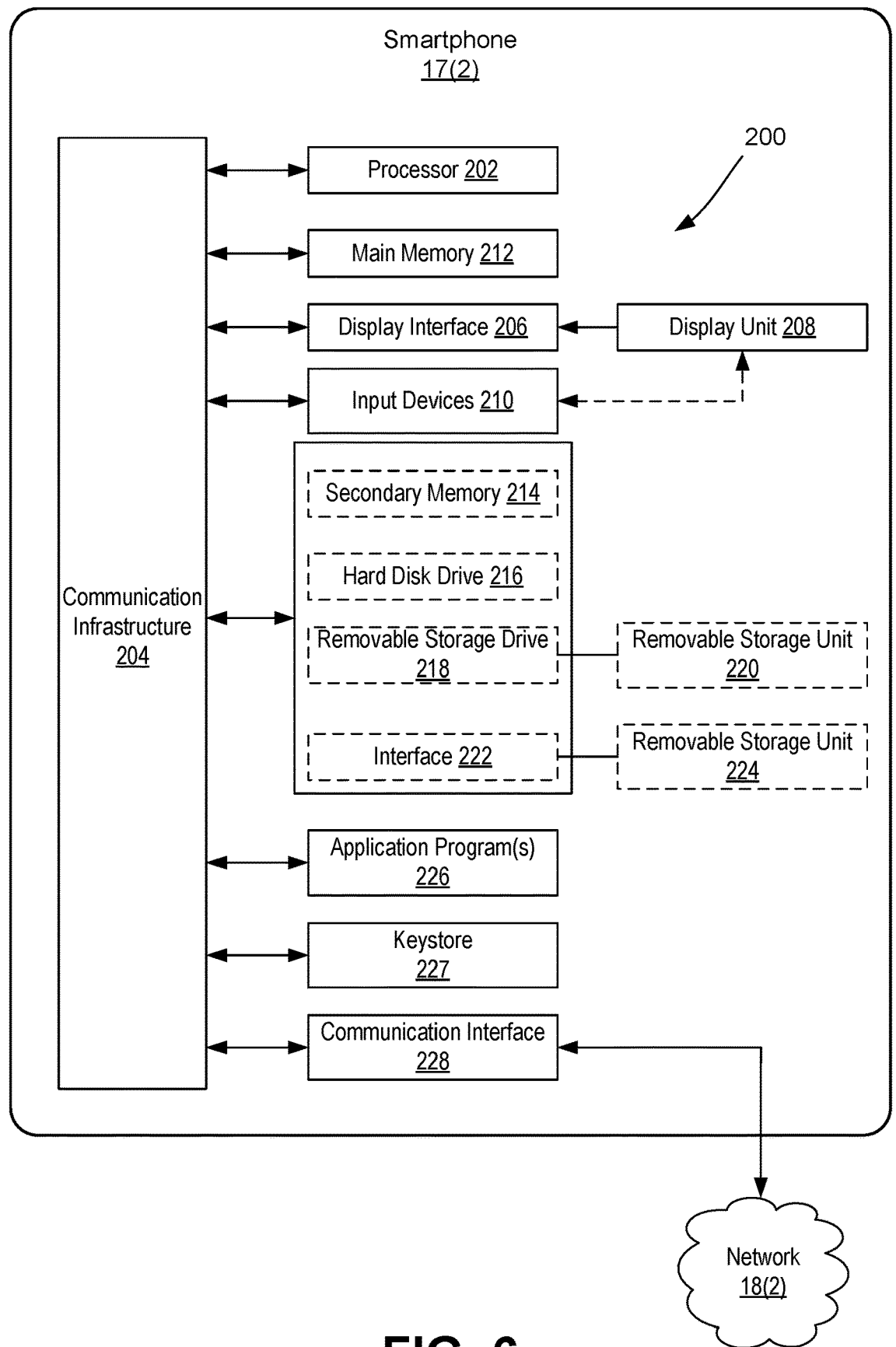
FIG. 6 is a block diagram illustrating at least one embodiment of a personal computing device to be used as the trusted/bonded device for authentication sessions.

FIG. 6 is a block diagram illustrating at least one embodiment of a personal computing device 17(2) (hereinafter "smartphone 17(2)") for communicating with the access management system 12 of the present disclosure. The smartphone 17(2) generally includes a computing system 200. As shown, the computing system 200 includes one or more processors, such as processor 202. Processor 202 is operably connected to communication infrastructure 204 (e.g., a communications bus, cross-over bar, or network). The processor 202 may be embodied as any type of processor capable of performing the functions described herein. For example, the processor may be embodied as a single or multi-core processor(s), digital signal processor, microcontroller, or other processor or processing/controlling circuit.

The computing system 200 further includes a display interface 206 that forwards graphics, text, sounds, and other data from communication infrastructure 204 (or from a frame buffer not shown) for display on display unit 208. The computing system further includes input devices 210. The input devices 210 may include one or more devices for interacting with the user smartphone 17(2), such as a keypad, mouse, trackball, microphone, camera, as well as other input components, including motion sensors, and the like. In one embodiment, the display unit 208 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the user smartphone 17(2), such as accessing and interacting with applications executed on the smartphone 17(2), including an app associated with the access management system 12 and the registration and authentication services provided. For example, the app may include an access management software application may include user agent(s) to be used for completing the registration process and used in future authentication sessions (i.e., future sessions or events in which the user is authenticated and granted access to the protected resource(s)).

The term "user agent" may generally refer to a service that runs in direct response to, and communication with, a user. In the context of the access management system 12, for example, the user agent may be a system that supports the user-centric features of the collaborating system, such as registration and then secure storage of any identity-related properties, tokens, or identifiers that are mandated by the access management system 12, thereby ensuring that storage of such data is secure.

For example, as used herein, the term "authenticator" is an example of a user agent that performs a more specific role, namely of exchanging necessary user data directly with the access management system 12 for the purposes of authenticating the user so as to gain access to protected resource(s) provided by the relying party 14. In other words, the authenticator is a user agent that may directly establish an authentication session with the access management system 12 by direct communication. Additionally, or alternatively, the code generator module is a user agent that participates in the registration session and certain configuration exchange with the access management system 12 but does not directly establish an authentication session with the access management system 12.

The computing system 200 further includes main memory 212, such as random access memory (RAM), and may also include secondary memory 214. The main memory 212 and secondary memory 214 may be embodied as any type of device or devices configured for short-term or long-term storage of data such as, for example, memory devices and circuits, memory cards, hard disk drives, solid-state drives, or other data storage devices. Similarly, the memory 212, 214 may be embodied as any type of volatile or non-volatile memory or data storage capable of performing the functions described herein.

In the illustrative embodiment, the user smartphone 17(2) may maintain one or more application programs, databases, media and/or other information in the main and/or secondary memory 212, 214. The secondary memory 214 may include, for example, a hard disk drive 216 and/or removable storage drive 218, representing a floppy disk drive, a magnetic tape drive, an optical disk drive, etc. Removable storage drive 218 reads from and/or writes to removable storage unit 220 in any known manner. The removable storage unit 220 may represents a floppy disk, magnetic tape, optical disk, etc. which is read by and written to by removable storage drive 218. As will be appreciated, removable storage unit 220 includes a computer usable storage medium having stored therein computer software and/or data.

In alternative embodiments, the secondary memory 214 may include other similar devices for allowing computer programs or other instructions to be loaded into the computing system 200. Such devices may include, for example, a removable storage unit 224 and interface 222. Examples of such may include a program cartridge and cartridge interface (such as that found in video game devices), a removable memory chip (such as an erasable programmable read only memory (EPROM), or programmable read only memory (PROM)) and associated socket, and other removable storage units 224 and interfaces 222, which allow software and data to be transferred from removable storage unit 224 to the computing system 200.

The computing system 200 further includes one or more application programs 226 directly stored thereon. The application program(s) 226 may include any number of different software application programs, each configured to execute a specific task, including the access management system software used for registration and authentication purposes.

In some embodiments, the computing system 200 may further include a hardware-backed keystore 227, or similar repository, in which certain private keys, certificates, and symmetric keys can be stored. As previously described, an additional aspect of the registration process is a key exchange (certificate exchange) between the access management system 12 and the smartphone 17(2) to thereby improve the security of registration. In particular, the system 10 may utilize public-key cryptography, or asymmetric cryptography, in which the smartphone 17(2) can generate a pair of keys: a public key and a private key, and send the public key to the access management system 12 while storing the private key on the hardware-backed keystore 227 on the smartphone 17(2). The system 10 can then rely on attestation for assertion that the public key is provided from a valid, secure hardware-backed keystore. The key exchange initiated by the user agent provides an additional security measure for the registration and authentication processes in that, there is a chance that a rogue malware agent on the smartphone 17(2) might access the canonical secret if the user agent software is not well written. That slight chance of security breach is effectively reduced to none by sending a public key from the smartphone 17(2) with a hardware-backed keystore (so the private key can never leave the smartphone 17(2) or even be accessed by app memory).

The computing system 200 further includes a communications interface 228. The communications interface 228 may be embodied as any communication circuit, device, or collection thereof, capable of enabling communications between the user smartphone 17(2) and external devices. The communications interface 228 may be configured to use any one or more communication technology and associated protocols, as described above, to effect such communication. For example, the communications interface 228 may be configured to communicate and exchange data with the access management system 12 and relying party 14, as well as other computing devices, via a wireless transmission protocol including, but not limited to, Bluetooth communication, infrared communication, near field communication (NFC), radio-frequency identification (RFID) communication, cellular network communication, the most recently published versions of IEEE 802.11 transmission protocol standards, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 212 and/or secondary memory 214 or a local database on the user smartphone 17(2).

Computer programs may also be received via communications interface 228. Such computer programs, when executed, enable the computing system 200 to perform the features of the present invention, as discussed herein. In particular, the computer programs, including application programs 226, when executed, enable processor 202 to perform the features of the present invention. Accordingly, such computer programs represent controllers of computer system 200.

In one embodiment where the invention is implemented using software, the software may be stored in a computer program product and loaded into the computing system 200 using removable storage drive 218, hard drive 216 or communications interface 228. The control logic (software), when executed by processor 202, causes processor 202 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

As previously described herein, in some embodiments, voice and/or speech recognition may be used for authentication purposes. Voice recognition, also commonly referred to a voiceprint, is the identification and authentication arm of the vocal modalities. By measuring the sounds a user makes while speaking, voice recognition software can measure the unique biological factors that, combined, produce the user's voice. Voiceprints can be measured passively as a user speaks naturally in conversation, or actively, if the user is made to speak a passphrase. The key is that true voice recognition measures the minutia of the voice, and is not wholly dependent on a spoken code or passphrase (though spoken passphrases can be used to speed up the process, they are not necessary). Speech recognition, on the other hand, is a technology that aims to discern the actual words being spoken in a voice sample and makes no claims against the identity of the user providing the sample or any other characteristic of their voice. When combined, speech and voice recognition can be a powerful duo, able to provide a strong means of authenticating a user.

The following examples of spoken phrase authentication techniques (described with respect to FIGS. 7-11), are based on a combination of features of speaker recognition, speech recognition and/or TOTP sequence. The end result is a natural and easy-to-use authentication that supports the requirements of multiple factor authentication (MFA) and further strengthens the authentication services provided by an access management system 12 consistent with the present disclosure.

Figure 10:
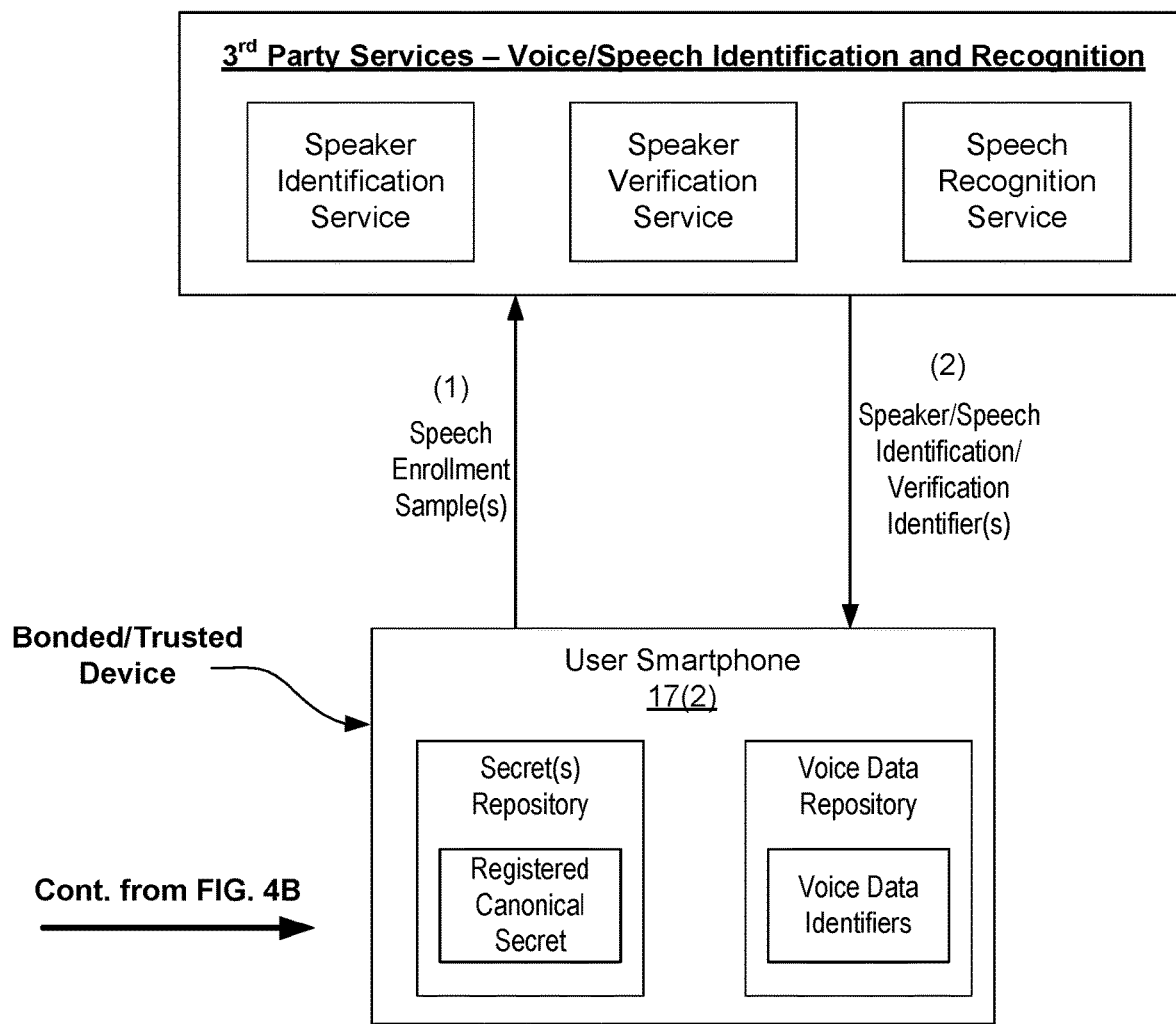
FIG. 10 is a block diagram illustrating an exemplary registration session in which a user's smartphone that has already undergone an initial registration procedure of FIGS. 4A and 4B further registers additional authentication factors, namely speech and voice identification and recognition factors.
Figure 11:
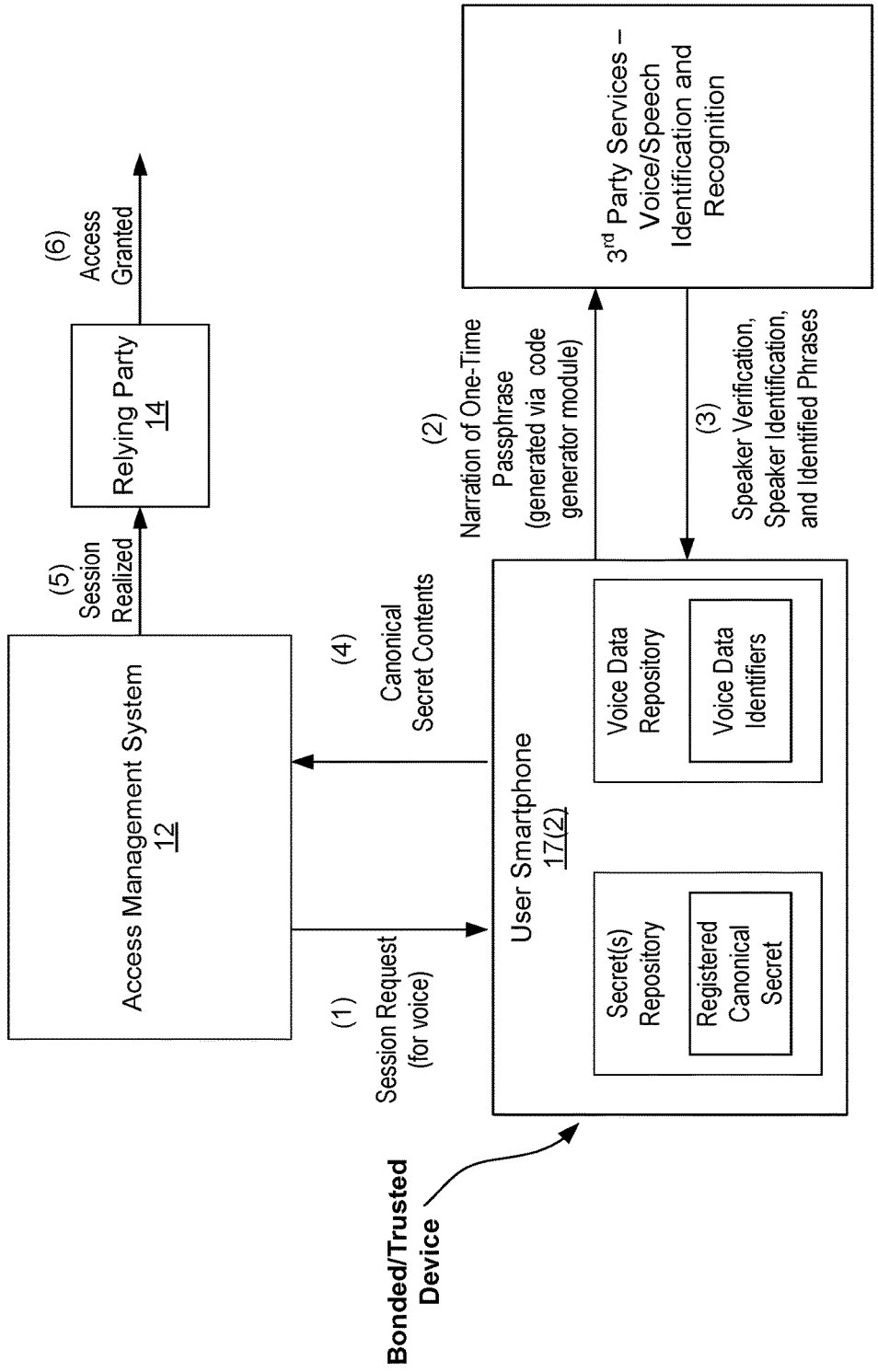
FIG. 11 is a block diagram illustrating an exemplary authentication session including use of a spoken passphrase as an additional authentication factor used in the authentication process.

FIGS. 7, 8A-8B, and 9A-9B illustrate a system providing a spoken authentication service including an access management system-driven, voice profile matching and phrase verification authentication model. FIGS. 10 and 11 illustrate a system providing a spoken authentication service including a user agent-driven voice profile and phrase verification authentication model using a mediated, access management system-derived session exchange.

With reference to FIGS. 7, 8A-8B, and 9A-9B, this system embodiment concerns the use of speaker identification and speech recognition with a TOTP composed from a user-tailorable dictionary of finite discrete words, which is herein referred to as a Time-Oriented Word Sequence (TOWS).

Figure 7:
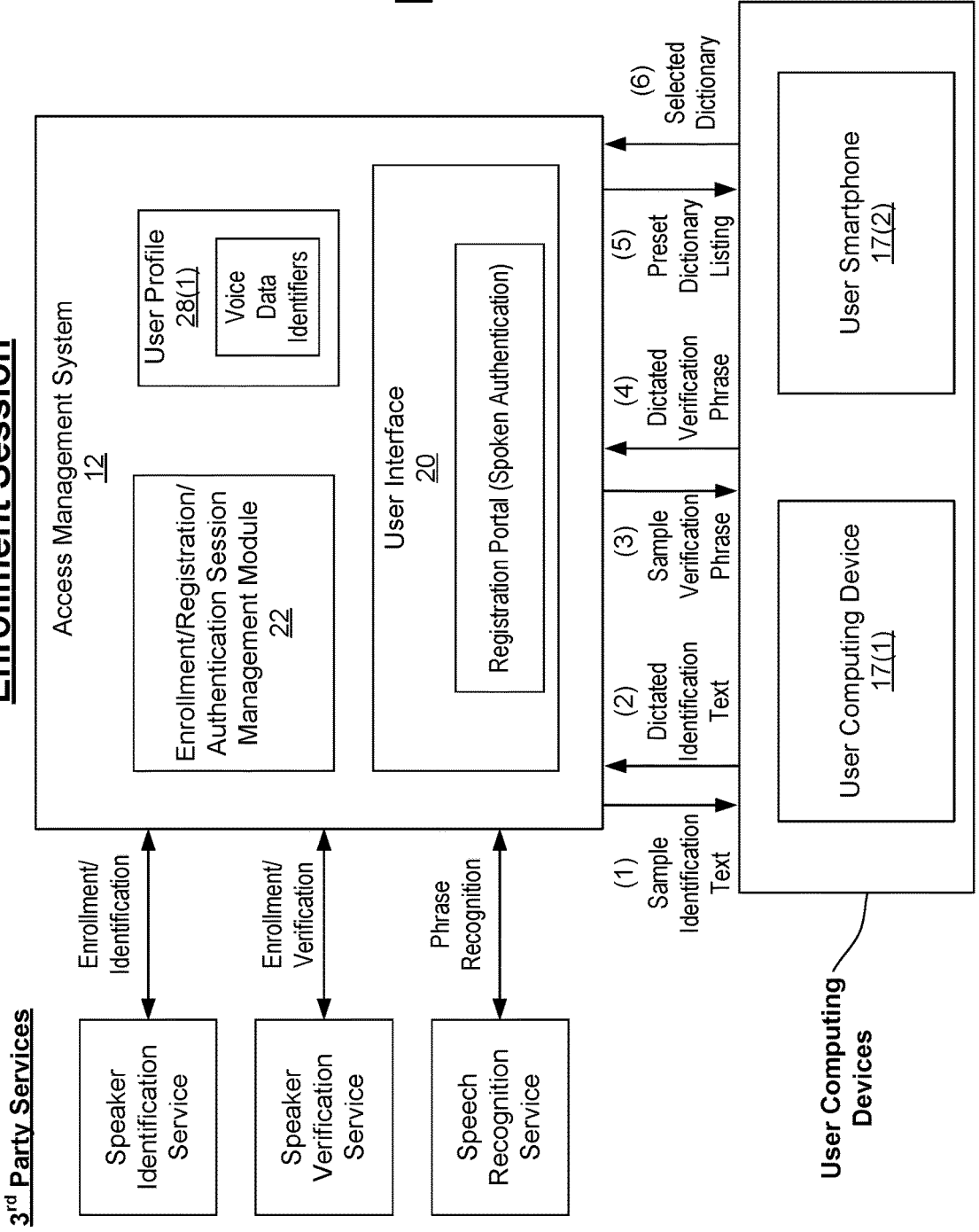
FIG. 7 is a block diagram illustrating an exemplary registration session between a user computing device, a user smartphone, and the access management system for registering a user with a spoken authentication service provided by the access management system.

FIG. 7 is a block diagram illustrating an exemplary registration session between a user computing device 17(1), a user smartphone 17(2), and the access management system 12 for registering a user with a spoken authentication service provided by the access management system 12. It should be noted that registration is required to submit voice samples with a speech recognition service and speaker identification service (3rd party services), and to configure and pre-seed a code generator. The initial registration process is driven by the access management system. It is also possible to consider registration as a distinct prior setup step (prior to attempting access to the relying party), as there is voice training and dictionary configuration to complete.

The process begins when a user navigates to a registration page for the spoken authentication service with an access management system, which may be aware of the user's unique authentication identifier or username (typically an email address). It should be noted that this step may have a prior credential with that same identifier in some other authentication system. In other words, a user may have already registered with the access management system (in a similar fashion as described with respect to FIGS. 4A and 4B). In such a scenario, the user is effectively registering for spoken authentication services. As such, the access management system may consider the user's capability to complete authentication with the prior system as a valid proof of identity for registration with the spoken authentication service.

The user is first guided, via the registration portal (spoken authentication) of the user interface 20, through a speaker recognition registration phase involving speaker identification. This step involves the user narrating text for a period of time (e.g., approximately 30 seconds) to provide a rich sample for the speaker identification service. For example, a user may be shown sample identification text and, by speaking into the microphone of their smartphone 17(2) can transmit dictated identification text to the access management system to be passed on to the speaker identification service. Although the speaker identification service may support any free text, the access management system may suggest, or even force, a chosen narrative that explores phonetically desirable traits. For example, the access management system may provide a sample piece of poetry or dramatic prose, to enforce pronounced enunciation of key phonetic structures. A voice data identifier is created and stored in the user profile.

In some embodiments, an additional step of speaker recognition may include speaker verification. This step involves a precise phrase chosen from a small selection of available phrases with a speaker verification service and narrated until an acceptable sample of that exact phrase is achieved. It should be noted that, unlike speaker identification, that can match any free text with the user's profile, this speaker verification sample is intended to be repeated verbatim by the end-user. This optional additional step may be used to confirm a user's possible identity match when the speaker identification score does not reach a certain level of full confidence (i.e., falls below a threshold level of acceptable confidence during an authentication session). Furthermore, in some embodiments, the user may be provided with a dictionary selection page, which may involve the user selecting from a preset list of dictionaries, or even allowing the user to provide a dictionary of their own choosing. The dictionary should be of a minimum of 100 words, each of two syllables minimum. It is not necessary for the user to narrate the dictionary, just to provide the list of words that will be used for future authentication. In the event that this additional step is not included as part of the speaker recognition, then a standard shared dictionary will be used. This might be of considerably larger than 100 words. The capability to assign a user-tailored dictionary is considered a major advantage of this approach. In. this way different spoken languages might even be supported, as long as the speaker identification service supports those vocabularies.

The User must now register a compatible code generator and will be prompted to download/install one on a single code generator device (i.e., the smartphone 17(2)), wherein this device will be used for all future passphrase generation.

Figure 8A:
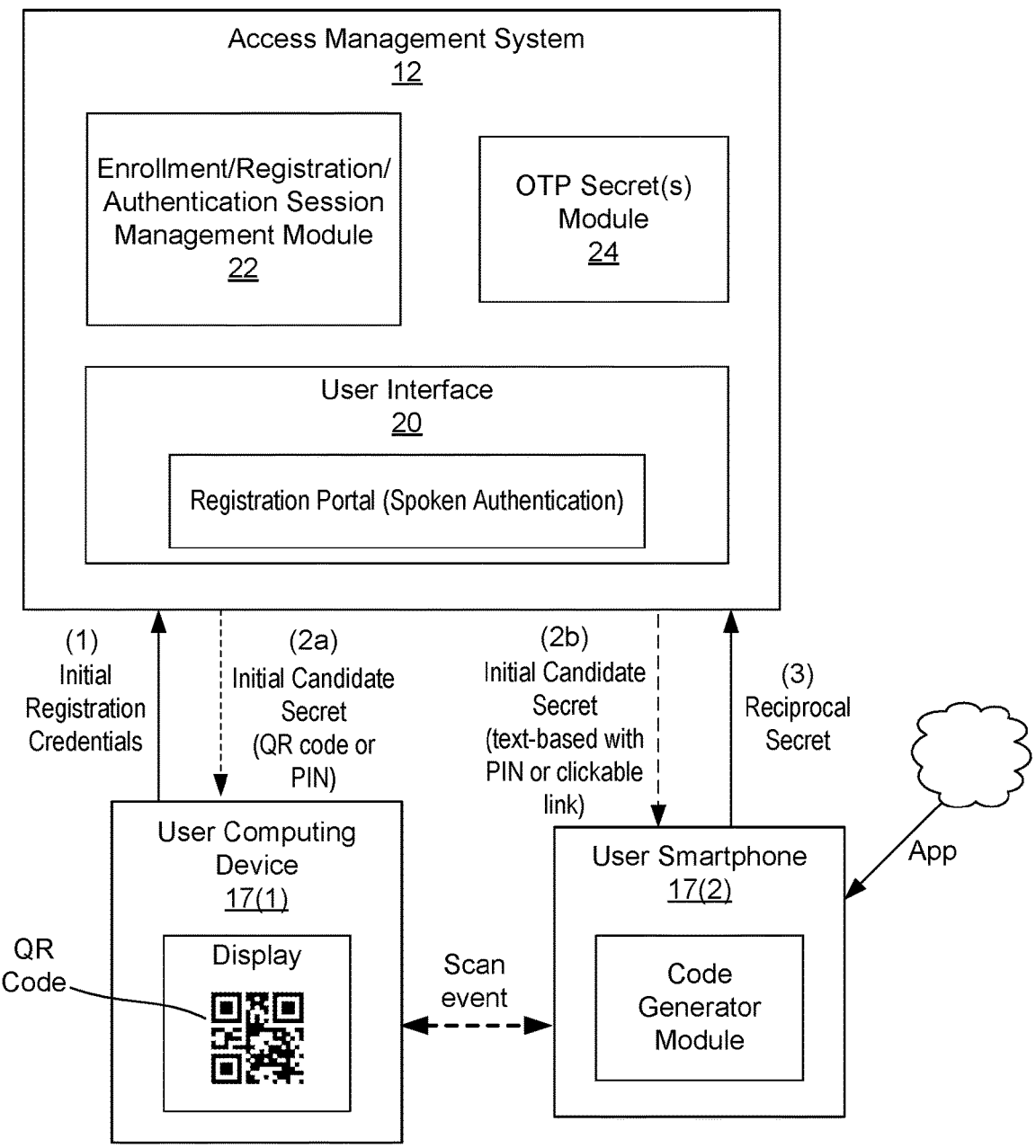
FIGS. 8A and 8B are block diagrams illustrating an exemplary registration session between a user computing device, a user smartphone, and the access management system for registering a user with access management system services, including the spoken authentication service, which is required in order to undergo future authentication sessions so as to access a relying party's protected resources.
Figure 8B:
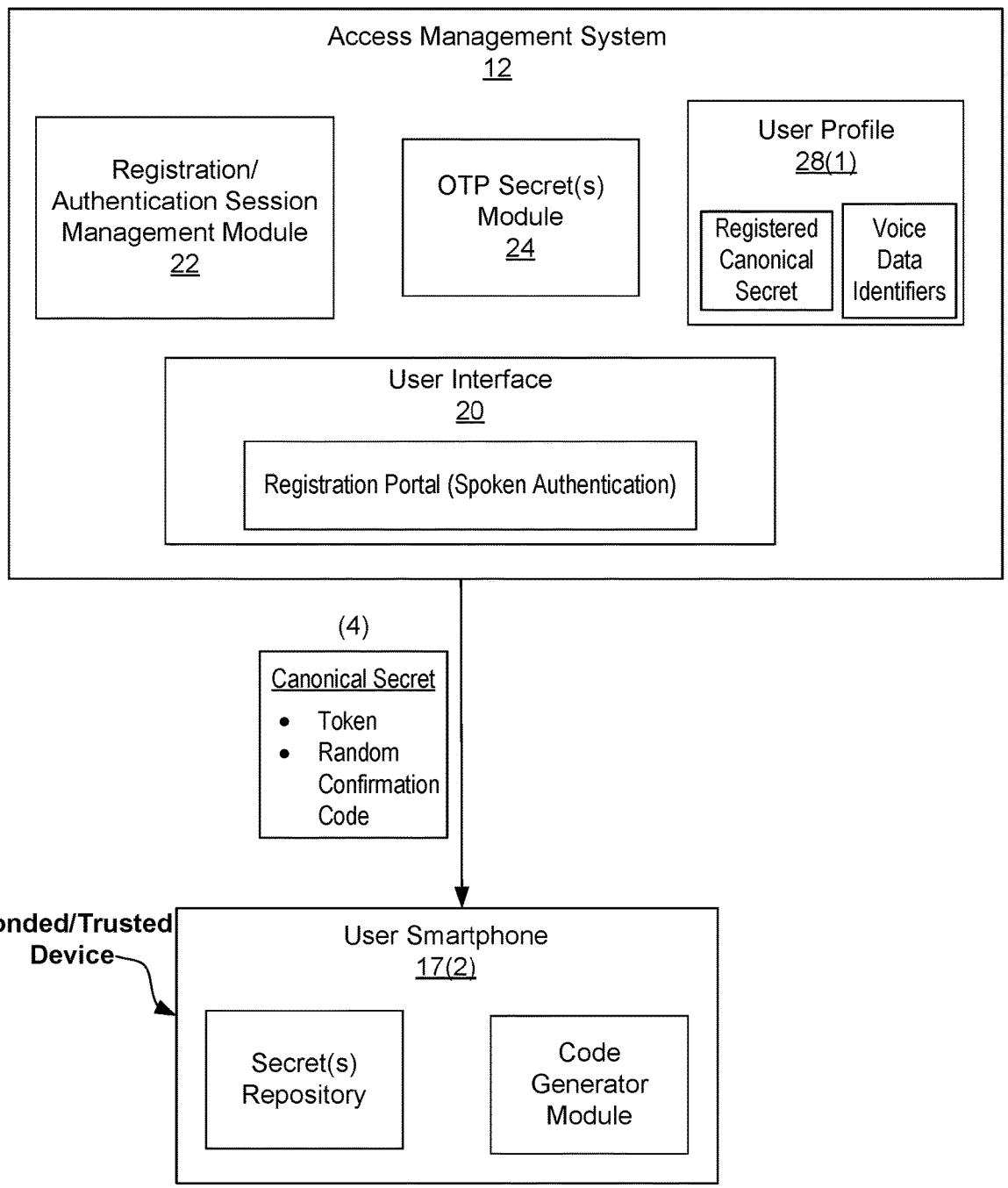

FIGS. 8A and 8B are block diagrams illustrating an exemplary registration session between a user computing device, a user smartphone, and the access management system for registering a user with access management system services, including the spoken authentication service, which is required in order to undergo future authentication sessions so as to access a relying party's protected resources. This process of registration proceeds in a similar fashion as described with respect to, and shown in, FIGS. 4A and 4B. For example, an introduction secret is generated, in a Reciprocal TOTP (RTOTP) scheme, which is intended to be relayed to the code Generator, either by displaying a scannable QR code or some other means (such as emailing or direct messaging a suitable link to the chosen device and then opened with the code generator application running natively on the device). In accordance with RTOTP, a candidate secret is generated and sent to the reciprocation URL contained in the RTOTP otpauth URL. The reciprocation response from the smartphone 17(2) is as described by RTOTP but with some additional features, noted immediately below.

It should be noted that this example does not require a template session-realization URL, since there will be no transmission to the access management system from this device (it is not an authenticator but a code generator). Similarly, the public key for signing is not necessary, since no further communication will take place. Rather, the user's full dictionary (or a URL to retrieve it) is sent, in which the words will be used to generate pass phrases in future.

An ordered list of check-image URLs will be sent, the purpose of which is to attach an easy-to-recognize visual representation of an entire phrase based on a suitable algorithm. The purpose of the check-image URL is to provide a visual representation of each unique phrase (combination of words), which will assist a user in selecting a phrase from a list of phonetically similar phrases that might differ by only one character, or plural. As such, a user simply has to match the check image.

The ordered list of check-image URLs may generally consist of an ordered list of images with an easy-to-use reference to lookup the image data. This list may be fixed at the point of registration. The system may rely on a relatively simple algorithm for producing a repeatable numeric representation of any given phrase in the range 0 to (number of images−1). Consequently, a consistent image can be shown in the candidate phrase list at the smartphone, one of which will match the single session identifier passphrase shown on the screen for the authentication portal during an authentication session. In some rare cases, an accidental collision will occur and the same image might appear for more than one candidate phrase. This can be alleviated with a larger quantity of images, and careful selection of an algorithm. An exemplary algorithm includes a Java hashcode algorithm for Strings applied to a concatenation of the phrase words with a given separator into one string, then subject to modulo arithmetic by the number of images available.

Upon completion of the registration session, the canonical secret is stored, which is key to future passphrase generation. As the canonical secret has been exchanged peer-to-peer, it is considered more secure than standard TOTP and ensures a bonded-device metaphor (i.e., the secret cannot co-exist on any other device, since reciprocation is allowed only once). At this point, the user may use the code generator to generate a one-time passphrase and narrate the OTP into the registration portal as a verification step. If verification is completed, the canonical secret is locked in and the user's identity is registered. It should be noted that, if the registration was initiated from within an authentication context (i.e., the user had launched the relying party and attempted to authenticate without previously having completed registration) then the successful registration also qualifies as successful authentication, since the verification phrase completes a second factor.

Accordingly, registration involves the user registering for the service and providing samples used for speaker identification, speaker verification and speech Recognition, and, in some embodiments, may involve the construction of a user-specific dictionary of a minimum of 100 words, for example. Registration further involves the formation of a seed secret for each discrete user according to the TOTP algorithm (the standard RFC 6238) or a similar algorithm, such as RFC 4226, or preferably in a manner similar to the reciprocal TOTP process described with respect to, and shown in, FIGS. 4A and 4B, to ensure a peer-to-peer secure exchange. The secret is registered on a separate system that behaves as a code generator but, unlike standard TOTP code generators, the code generator expresses the current OTP for a given interval (typically 30 seconds) as a passphrase composed of a minimum of 3 words from the user's Dictionary. The full list of words in the user's Dictionary is also exchanged with the seed secret during registration.

Figure 9A:
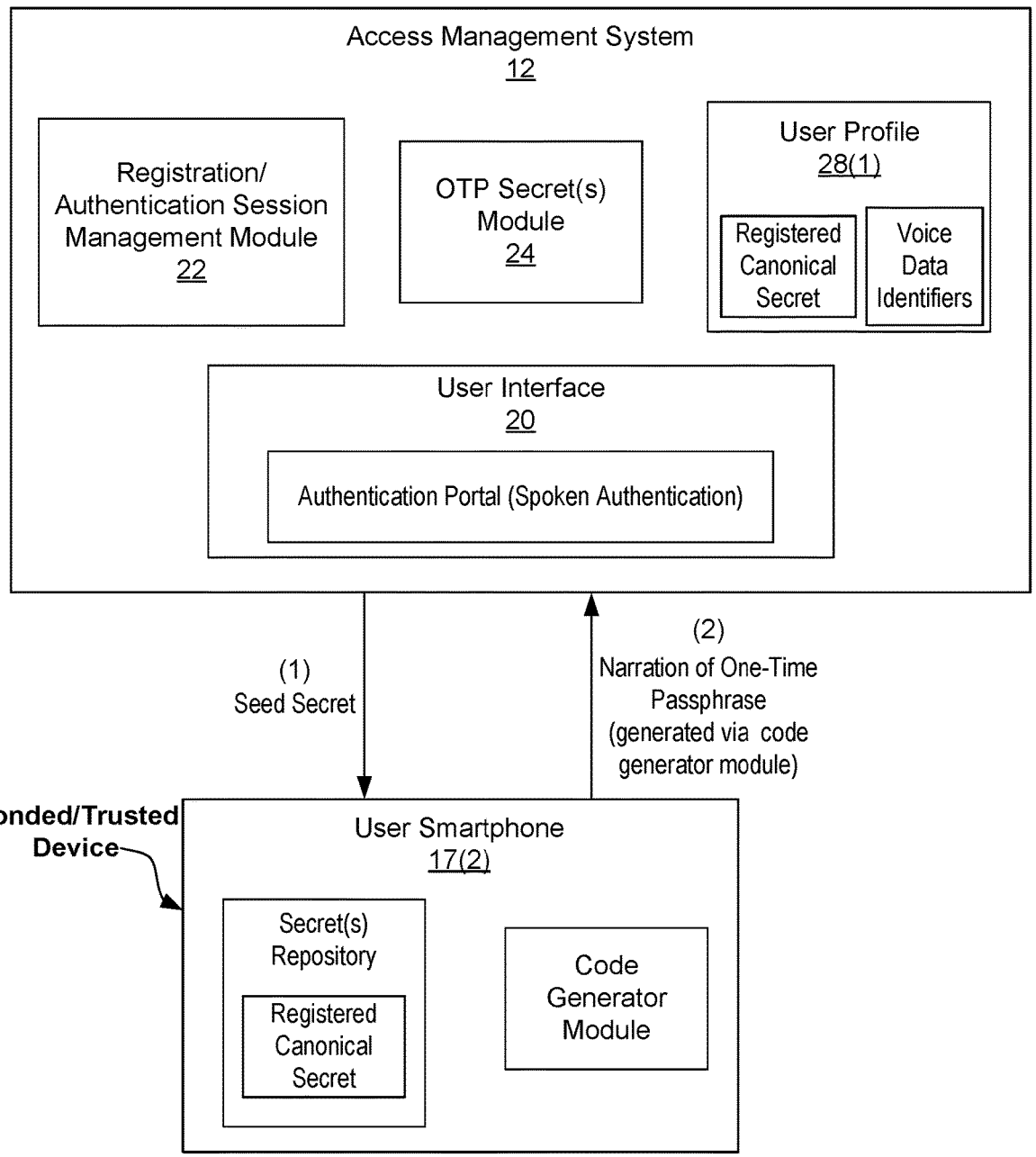
FIGS. 9A and 9B are block diagrams illustrating an exemplary authentication session based on the spoken authentication service provided by the access management system, including voice profile matching and phrase verification authentication of a user attempting to access a relying party's protected resources.
Figure 9B:
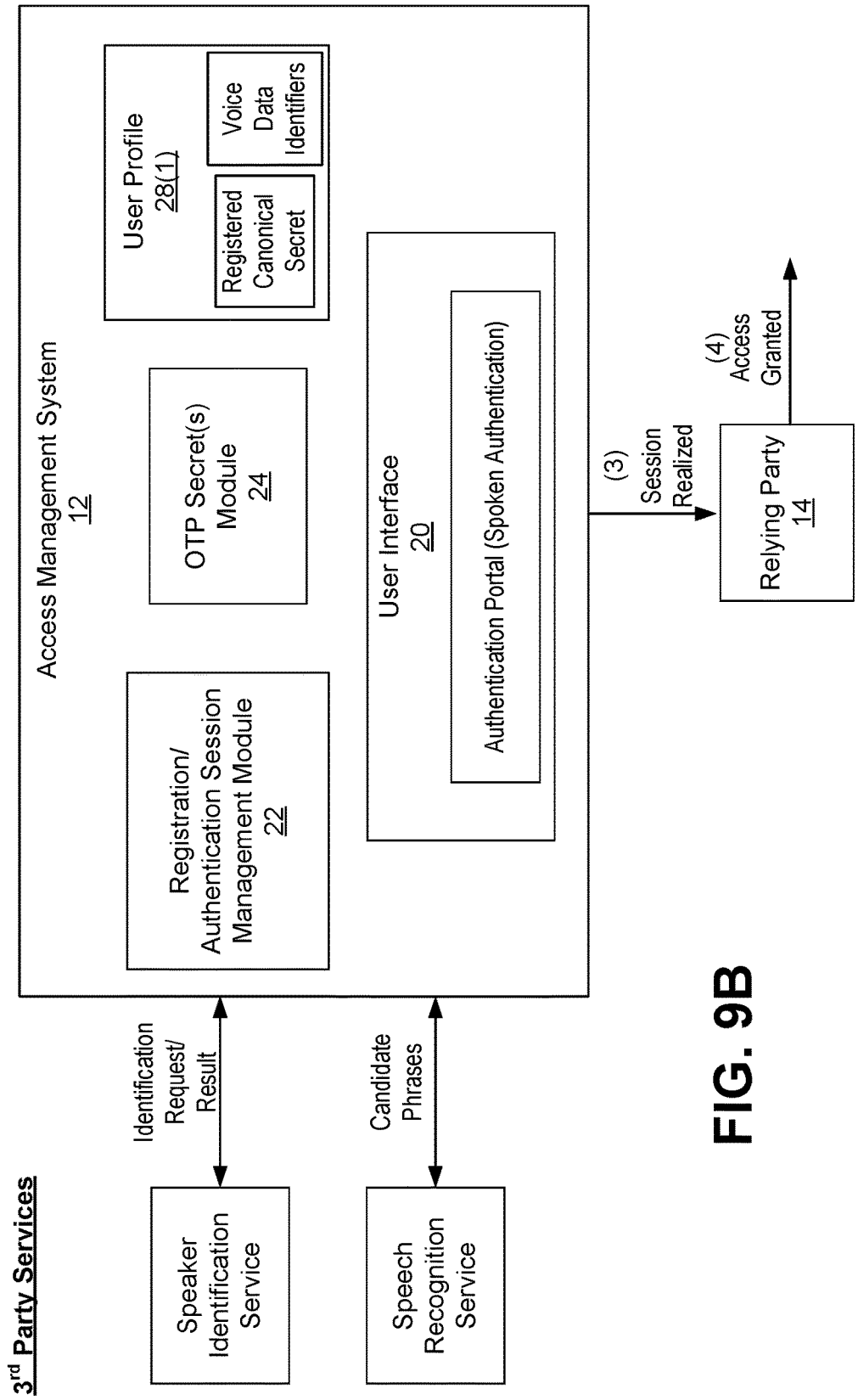

FIGS. 9A and 9B are block diagrams illustrating an exemplary authentication session based on the spoken authentication service provided by the access management system, including voice profile matching and phrase verification authentication of a user attempting to access a relying party's protected resources.

Authentication involves simply dictating the current (e.g., a minimum 3 words) pass phrase into the authentication portal (that may be part of the authenticating application itself). In turn, speech recognition is applied to the sample and solicits a user choice if there are multiple similar phrases and may also involve the display of a check image to help with user identification. The access management system performs a speaker identification match on the sample, to find a list of possibly matching users. Furthermore, the access management system may resort to a speaker verification sample if there is a small list of possible matching users. The appropriate seed secret is retrieved and a TOTP verification is performed to find the single user that matches.

For example, authentication may generally involve the user accessing the authentication portal provided via the user interface of the access management system, in order to interact directly with the access management system, typically within the context of a relying party requiring authentication. It should be noted that, in this scenario, the access management system is not necessarily a separate entity to the relying party. That is, this model of authentication is a novel adaptation of the existing direct-to-client-device model, rather than the three one-way relay model previously described herein.

The authentication session may begin upon a user attempting to login with a relying party, which, in turn, redirects the user to an authentication portal of either a separate authentication authority (i.e., access management system) or, alternatively, an authentication page of the relying party (in which case it can be referred to as a "service provider"). The user invokes their pre-registered code generator that shows a time-oriented three word (or four word) phrase, from the TOTP code using the algorithm at [RFC 6238] or a similar algorithm. It should be noted that the passphrase could be any number of words. The passphrase is calculated using a standard truncation as shown in that algorithm, to produce a 6-digit or 8-digit code. Using a 100-word dictionary a three or four word phrase is then mapped by taking pairs of digits to calculate a number from 0 to 99 and indexing into the ordered dictionary of words. Effectively, this model involves calculating 3 (or 4)×base-100 words that then index into the dictionary. In some embodiments, the truncation feature of the algorithm at [RFC 6238] might be adapted to produce any base ordinal number corresponding to the size of the dictionary. It is suggested a minimum size of dictionary is 100, but a larger dictionary is encouraged as more secure, within the boundaries of patience of the registering user, of course. In some embodiments, a check image may be shown from the list exchanged during registration, and calculated from an algorithm dependent on the exact characters of the passphrase.

The use of a dictionary involves mapping various numeric schemes to phrases. The key underlying concept is to treat the dictionary as an ordered set of discrete entries in a number base system. Much as 0, 1, 2, 3, 4 ... C, D, E, F etc. represent ordered entries in a hexadecimal numbering system, so an ordered dictionary of words can represent numbers, a selection of which is illustrated in Table 1 below:

TABLE 1

Exemplary Dictionary of Words/Numbers

| Ordinal | Word |
| --- | --- |
| 0 | Forgetful |
| . | . |
| . | . |
| 21 | Carpenter |
| . | . |
| . | . |
| 28 | Vanishing |
| . | . |
| . | . |
| 37 | Gravity |
| . | . |
| . | . |

TABLE 1-continued

Exemplary Dictionary of Words/Numbers

| Ordinal | Word |
| --- | --- |
| 62 | Telephone |
| . | . |
| . | . |
| 79 | Department |
| . | . |
| . | . |
| 99 | Multiply |

With this scheme, it is possible to represent an 8-digit OTP using four words or phrases. For example, the OTP "62213779" can be shown as four 2-digit numbers "62-21-37-79" and converted to the Dictionary words, by index of: "Telephone-Carpenter-Gravity-Department". It should further be noted that a given dictionary might be tailored for a given user, or even selected from a prepared set of stock dictionaries organized by language and/or topic. As the code generator is TOTP-based, it is sufficient to mandate a 100-word minimum dictionary. A higher number of entries may result in fewer required words in the passphrase. For example, if 1,000 words are provided in the dictionary then a 6-digit TOTP can be represented by just two words.

Upon being shown the passphrase, the user now narrates the passphrase directly into the narration capable authentication portal/page via their smartphone. The capability to access a microphone to obtain a voice sample is supported, for example, in web applications by the HTML5 Web Speech API. The sample is now analyzed for speaker identification and speech recognition in order to determine an appropriate matching voice profile and the precise spoken words.

It should be noted that there are options for the order in which this processing is carried out, based on a number of factors (i.e., accuracy of speaker identification, number of samples that can be considered, etc.). For example, a key requirement of spoken authentication is the capability to match a registered speaker with a given sample of free text. As described herein, speaker recognition services fall into two categories: speaker verification and speaker identification. Speaker verification requires a given text and so might not be suitable for free text matching. It is also known that some speaker identification services have an upper limit of the number of candidate profiles that can be considered for match, which might prove to be a limitation for the spoken time-oriented passphrase method, since the concept requires no prior username and relies on a direct match of the sample against a potentially large set of registered samples. Accordingly, for this reason, it might be appropriate to adopt a different order of verification that matches by the derived OTP in numeric form first.

For example, for each user, there is a single canonical secret (via RTOTP), used as a seed for keyed-hash message authentication code (HMAC) generation (also referred to as hash-based message authentication code) with a time skew for each 30-second bucket (see RFC 6238). Periodically, a service may run to calculate the expected TOTP passcodes for every user for each 30-second bucket over the next n minutes, depending on capacity. Each TOTP passcode can then be converted to the appropriate passphrase for that User and stored for lookup. ["select userid from current_passphrases where bucket=<now> and passphrase=<provided>"]. This can be an in-memory service, or a database with an index of (TOTP time bucket, Passphrase) against the user's internal identifier. Consequently, for any given 6- or 8-digit OTP passcode, it is straightforward to look up the list of users for whom the passcode is valid, for that given time bucket. Naturally the memory structure or database should be purged at the same time as bulk update, to avoid exponential growth. Once the small list of matching users is obtained, it should be straightforward to perform a speaker identification call for the set of registered profiles of those users to determine which one matches. Additionally, or alternatively, in some embodiments a specific question could be displayed to the user, thereby prompting the user to speak and provide a verbal answer to the question. For example, a written request of "What is your name?" or a variant thereof ("Please state your name", "Who are you?", etc.) may be displayed to the user, thereby prompting the user to verbally provide their name.

Referring back to the authentication session, for speaker Identification, if there are multiple profiles with a similar match score, then the access management system may fall back to an additional speaker verification sample, for additional verification. This will be most appropriate if there are a small number of potential matches, of a similar match score—or if the match (or matches) are of a comparatively low but not insignificant likelihood. Alternatively, if there are a low number of high matches, it may be acceptable to iterate over the pass phrases for TOTP verification and test for a match. For speech recognition, if there are multiple phrases of a similar likelihood, then the access management system should display a list of the likely phrases together with a check image, calculated from the ordered list as exchanged during registration/reciprocation. For example, in some embodiments, the algorithm for testing for a match may include certain rules to improve accuracy, such rules including, but not limited to, accounting for whether phrases differ only by virtue of plurality or tense, supporting a very finite definition of "low" number of matches (i.e., ten or less, five or less, etc.), supporting a very finite definition of "high" number of matches. Naturally, the algorithm must be the same as that used with regard to the check image. The actual phrase can then be confirmed by user selection.

Once an appropriate phrase has been determined and an appropriate user, the phrase is translated into an appropriate one-time word sequence verification according to an algorithm described herein. For example, the phrase may be translated into a TOTP representation and validated against the seed secret held for the given user. If a match is found, the user is identified in a positive authentication result, provided to the relying party. If a match is not found, the authentication result returns failure.

FIGS. 10 and 11 illustrate a system providing a spoken authentication service including a user agent-driven voice profile and phrase verification authentication model using a mediated, access management system-derived session exchange. As will be described in greater detail herein, the user agent stores and verifies voiceprint identifiers and is responsible for ensuring the identification matches. It should be noted that a given session identifier is generated by the access management system in the same tripartite relationship previously described herein. However, for a spoken authentication service, the identifier consists of three or four words to make a statistically unique sequence, and hence draws from a global dictionary that might be quite extensive. The phrase is dictated into the user agent running on the smartphone, which then attempts a speaker identification call and allows the user to select the correct phrase from a list of candidates. The session is then realized by the standard authentication mechanism previously described herein, albeit for a session identifier in a phrase format.

This approach inherits all the security advantages of the authentication techniques described herein with reference to, and shown in, FIG. 5, but adds additional features in the form of secure speaker identification and check-image CAPTCHA. This approach also benefits from a spoken transmission of the session identifier rather than a QR Code (which requires pointing a separate camera at the computer screen—possibly violating on-site security preferences with sensitive on-screen data.). There are also privacy safeguards, such as the capability to hold a speaker recognition profile ID only with the user agent and not the shared with an access management system.

FIG. 10 is a block diagram illustrating an exemplary registration session in which a user's smartphone that has already undergone an initial registration procedure of FIGS. 4A and 4B further registers additional authentication factors, namely speech and voice identification and recognition factors.

The registration session generally follows the process previously described herein with reference to, and shown in, FIGS. 4A and 4B. It is anticipated there will be some prior credential, whether that be an external system or a bespoke, internal system such as a username/password stored in a hashed/salted database (or some other prior trust model) as a precursor to entering the registration process. In that sense, inline registration is an elevation of an existing credential. In alternative embodiments, registration may be a separate, bespoke step that is initiated through a registration portal. In that flow, there is no need for a prior credential, and the end result is just registration, not an in-situ authentication at a relying party.

Upon completing the initial registration (by entering a verification code, the final step of registration) the user is now prompted to register speech samples on the smartphone. It should be noted that this may be an optional step. For example, the availability of speaker recognition as an additional authentication factor may be represented by an additional data item in the reciprocation data payload provided to the user via the registration portal (i.e., in the form of a flag, or optionally a URL, to which the user-specific speaker identifiers should be registered once speaker registration is complete).

A preset phrase may be displayed, via the smartphone, such as prose or a poem, in stages to collect samples to submit for speaker identification sampling. As previously described, a speaker identification service will generally require a minimum amount of sampled free speech (i.e., at least 30 seconds) but often a longer sample improves subsequent matches. Once sufficient samples are processed, the speaker identification service will register the speaker's profile and return a speaker identification profile ID, which is stored within a voice data repository of the smartphone (in the form of a voice data identifier).

In some embodiments, the user might be registered with an additional service, such as a speaker verification service, which involves dictating a known, stock phrase that may be used to confirm the identity of the user in future scenarios in the event that the speaker identification match is inconclusive. The resulting speaker identification profile ID may also be stored within the voice data repository of the smartphone. Furthermore, in some embodiments, the resulting speaker recognition identifiers are registered with the access management system, against the speaker registration URL provided in reciprocation data. In alternative embodiments, for privacy purposes, the speaker recognition identifiers might not be sent to the access management system, and may be held locally on the smartphone. In such a scenario, the smartphone is the sole medium for establishing all factors of the user identification.

FIG. 11 is a block diagram illustrating an exemplary authentication session including use of a spoken passphrase as an additional authentication factor used in the authentication process. The authentication session generally follows a similar authentication session process as previously described with reference to, and shown in, FIG. 5. However, there are some key differences, as described herein. For example, the public session identifier in a request-session response is now a passphrase of three or more words. The passphrase is generated randomly from an extensive ordered dictionary so that each word forms a number in a number base system. The dictionary should hold enough entries to ensure the session identifier passphrase is unique. For example, with a 1,000-word dictionary and a random three-word passphrase, there are 1000^3 permutations (or 1,000,000,000 unique session identifiers). The session identifier is requested of the access management system by the relying party, in a different runtime to that hosting the smartphone, such that it may be a physically disparate processing unit, and does not need, even, to be on the same network.

Another difference is that, for a multi-mode access management system, it may be necessary to offer the user a choice of the type of session identifier and the method of delivery. For example, a user of the initial authentication session (referencing FIG. 5) might require a session identifier as a scannable QR code, while a user of the spoken authentication session (referencing FIGS. 9A, 9B, and 11) would require a three-word session identifier passphrase.

Furthermore, the passphrase may be displayed on the device that hosts the relying party's invocation of the access management system, together with a check-image calculated algorithmically from the unique phrase. This algorithm is also known by the smartphone.

Another difference is that the user now dictates the passphrase directly into the smartphone, which may require other biometric/PIN entry (such as a fingerprint) to open the application. This dictation replaces the QR code scan (or instant messaging transfer of session identifier scheme). Additionally, the phrase is submitted for speaker identification, to assert that it matches the registered speaker identification profile on the smartphone. There are various ways to achieve this depending on the privacy setting, as previously described herein.

Additionally, if the speaker identification service returns a positive match against the registered profile, the phrase is submitted for speech recognition, to discern the actual words spoken. Typically, this will result in a small number of phonetically similar candidate phrase matches. If there are a small number of similar phrases, these are displayed for the user to confirm which one was spoken. The check-image is also displayed for each phrase and to aid a visual match with the check-image shown on the screen of the relying party's session.

In the present embodiment, the user realization request is now composed and sent to the access management system. This is a standard authentication process in accordance with the systems and methods described herein, except that the session identifier is a phrase instead of a random globally unique identifier (GUID), with additional data to confirm the speaker identification match. Typically, this might be the URL of the speaker identification system's call to fetch the match result or if the speaker identification call is proxied to the access management system.

Furthermore, the standard enquire session functionality, used in the authentication session previously described herein, may now be used to establish the session and obtain the authenticating user's identifier with the relying party via the access management system holding the realized session data.

Accordingly, the present invention provides a secure and easy-to-use system for employing a single chosen device (such as a smartphone) as sole required proof of identity for all future authentication purposes, thereby providing credential-less or near credential-less authentication and verification techniques.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry.

Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

As described herein, various embodiments may be implemented using hardware elements, software elements, or any combination thereof. Examples of hardware elements may include processors, microprocessors, circuits, circuit elements (e.g., transistors, resistors, memristors, quantum computing devices, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A system for authenticating a user, the system comprising:
    a processor coupled to a non-transitory memory containing instructions executable by the processor to cause the system to:
    receive a request from an entity in response to attempted access to entity resources by a user via a primary user computing device;
    determine whether the user is registered with the system; and
    initiate one of a registration process and an authentication process with the user based on the determination;
    wherein a registration process comprises:
        establishing a peer-to-peer exchange of data between at least the system and the primary user computing device and a secondary user computing device;
        generating, via the system, an initial candidate secret and transmitting the initial candidate secret to one of the primary and secondary user computing devices via the peer-to-peer exchange;
        receiving a reciprocal secret from the secondary user computing device based on interaction between the secondary user computing device and the initial candidate secret, wherein the initial candidate secret is specific to the user and the secondary user computing device, and wherein the reciprocal secret is based on the initial candidate secret;
        generating, via the system, a canonical secret including a token and a random confirmation code and transmitting the canonical secret to the secondary user computing device via the peer-to-peer exchange ensuring a bonded device metaphor such that the canonical secret is a definitive secret only known and stored by the system and the secondary user computing device, wherein the token is associated with an expiry date and is stored on the secondary user computing device to be used for authenticating the user during a future authentication session in lieu of the user entering user login credentials for authentication; and
        registering the user with the system in response to receipt of the confirmation code from the secondary user computing device.

2. The system of claim 1, wherein the initial candidate secret, reciprocal secret, and canonical secret are based on a Time-based One-time Password (TOTP) algorithm.

3. The system of claim 1, wherein, prior to transmitting the initial candidate secret, the system invites the user to install at least one management system software application used for completing the registration process and the future authentication process.

4. The system of claim 1, wherein the token is used for OTP generation during the future authentication session.

5. The system of claim 1, wherein the traditional user login credentials comprise at least one of user identification information and a password.

6. The system of claim 5, wherein user identification information comprises at least one of a name of the user, a user ID, an email address of the user, and information likely to be known only to the user.

7. The system of claim 1, wherein the token comprises a built-in expiry date.

8. The system of claim 1, wherein the expiry date is associated with and controls a grant period during which the user can carry out an authentication session.

9. The system of claim 8, wherein the grant period and expiry date are determined by the entity.

10. The system of claim 1, wherein the future authentication process comprises:
    receiving an authentication session request from the entity, comprising at least one of a public session key and a private session key;
    detecting, via the secondary user computing device, the public session key;
    receiving one or more identifying secrets from the secondary user computing device based on detection of the public session key; and
    receiving an enquiry from the entity concerning an authentication result.

11. The system of claim 10, wherein the one or more identifying secrets comprises the token associated with the canonical secret.

12. The system of claim 10, wherein, upon receipt of a positive authentication result, the user is granted access to entity resources.

13. The system of claim 1, wherein the initial candidate secret comprises data associated with a QR code.

14. The system of claim 13, wherein transmitting the initial candidate secret to one of the primary and secondary user computing devices comprises displaying the QR code on a display of one of the primary and secondary user computing devices.

15. The system of claim 14, wherein interaction between the secondary user computing device and the initial candidate secret comprises a scanning event involving the QR code.

16. The system of claim 1, wherein the future authentication process comprises at least one of a biometric factor and a challenge-response factor, wherein a user is authenticated by satisfying at least one of the biometric and challenge-response factors.

17. The system of claim 16, wherein a user is authenticated by satisfying both the biometric and challenge-response factors.

18. The system of claim 16, wherein the biometric factor comprises at least one of a DNA sample, a fingerprint scan, a retina scan, a facial scan, a brain scan, an earlobe scan, a toeprint scan, a footprint scan, voice recognition, and speech recognition.

19. The system of claim 18, wherein the challenge-response factor comprises a passphrase.

20. The system of claim 19, wherein a user response to the challenge-response factor comprises a spoken response, which provides both a correct response and matches a biometric identification of a voice.

* * * * *